US010343508B2

(12) United States Patent
Sugiyama et al.

(10) Patent No.: US 10,343,508 B2
(45) Date of Patent: Jul. 9, 2019

(54) VEHICLE CONTROL APPARATUS

(71) Applicant: Toyota Jidosha Kabushiki Kaisha, Toyota (JP)

(72) Inventors: Koji Sugiyama, Toyota (JP); Kenta Kumazaki, Anjo (JP); Hiromichi Kimura, Okazaki (JP); Kazuyuki Shiiba, Miyoshi (JP); Tooru Matsubara, Toyota (JP); Shinichi Sasade, Toyota (JP); Takeshi Kitahata, Toyota (JP); Nobufusa Kobayashi, Anjo (JP); Masato Yoshikawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 20 days.

(21) Appl. No.: 15/831,593

(22) Filed: Dec. 5, 2017

(65) Prior Publication Data

US 2018/0170166 A1 Jun. 21, 2018

(30) Foreign Application Priority Data

Dec. 20, 2016 (JP) .................................. 2016-247202

(51) Int. Cl.
*B60K 6/365* (2007.10)
*B60K 6/445* (2007.10)
(Continued)

(52) U.S. Cl.
CPC .............. *B60K 6/365* (2013.01); *B60K 6/445* (2013.01); *B60K 6/547* (2013.01); *B60W 10/06* (2013.01);
(Continued)

(58) Field of Classification Search
CPC ........ B60K 6/365; B60K 6/445; B60K 6/547; B60W 10/06; B60W 10/08; B60W 10/10;
(Continued)

(56) References Cited

U.S. PATENT DOCUMENTS 7,101,308 B2* 9/2006 Joe ........................ B60L 15/20
477/3
7,217,221 B2* 5/2007 Sah ........................ B60K 6/445
477/3
(Continued)

FOREIGN PATENT DOCUMENTS

JP 2014-223888 12/2014

*Primary Examiner* — Tyler J Lee
(74) *Attorney, Agent, or Firm* — Oblon, McClelland, Maier & Neustadt, L.L.P.

(57) ABSTRACT

A vehicle control apparatus includes: a transmission shifting control portion configured to implement a shifting action of a step-variable transmission by controlling a releasing coupling device and an engaging coupling device; a hybrid control portion configured to control an output torque of a first motor/generator and an output torque of a second motor/generator, based on an output torque of an engine and a transmitted torque to be transmitted through an initiative coupling device, such that a rotational acceleration value of the second motor/generator and a rotational acceleration value of the engine are changed along respective target trajectories during the shifting action; and a target-trajectory setting portion configured to set the target trajectories, based on a maximum charging amount of an electric power that is chargeable to an electric power storage device and a maximum discharging amount of the electric power that is dischargeable from the electric power storage device.

14 Claims, 11 Drawing Sheets

(51) Int. Cl.
*B60W 30/19* (2012.01)
*B60W 10/10* (2012.01)
*B60K 6/547* (2007.10)
*B60W 10/06* (2006.01)
*B60W 10/08* (2006.01)
*B60W 10/115* (2012.01)
*B60W 10/26* (2006.01)
*B60W 20/30* (2016.01)

(52) U.S. Cl.
CPC ............ *B60W 10/08* (2013.01); *B60W 10/10* (2013.01); *B60W 10/115* (2013.01); *B60W 10/26* (2013.01); *B60W 20/30* (2013.01); *B60W 30/19* (2013.01); *B60W 2510/244* (2013.01); *B60W 2710/0661* (2013.01); *B60W 2710/082* (2013.01); *B60W 2710/083* (2013.01); *B60W 2710/248* (2013.01); *Y02T 10/6239* (2013.01); *Y02T 10/6286* (2013.01); *Y02T 10/7258* (2013.01)

(58) Field of Classification Search
CPC .... B60W 10/115; B60W 10/26; B60W 20/30; B60W 2510/244; B60W 2710/0661; B60W 2710/082; B60W 2710/083; B60W 2710/248; B60W 30/19; Y02T 10/6239; Y02T 10/6286; Y02T 10/7258
See application file for complete search history.

(56) References Cited

U.S. PATENT DOCUMENTS

| | | | | |
|---|---|---|---|---|
| 7,954,579 | B2* | 6/2011 | Rodriguez | B60W 10/08 180/65.265 |
| 8,170,736 | B2* | 5/2012 | Muta | B60W 10/06 180/65.1 |
| 8,606,488 | B2* | 12/2013 | Falkenstein | B60K 6/48 701/110 |
| 8,631,891 | B2* | 1/2014 | Wilmanowicz | B60W 20/15 180/69.3 |
| 8,868,274 | B2* | 10/2014 | Shiiba | B60L 11/14 701/22 |
| 9,487,210 | B2* | 11/2016 | Yamamoto | B60K 6/365 |
| 2005/0080535 | A1* | 4/2005 | Steinmetz | B60W 10/02 701/51 |
| 2005/0274553 | A1* | 12/2005 | Salman | B60K 6/52 180/65.28 |
| 2005/0279546 | A1* | 12/2005 | Tabata | B60K 6/445 180/65.235 |
| 2006/0003863 | A1* | 1/2006 | Tabata | B60K 6/445 477/2 |
| 2006/0166784 | A1* | 7/2006 | Tabata | B60K 6/445 477/37 |
| 2013/0274967 | A1* | 10/2013 | Tan | B60W 10/04 701/22 |
| 2014/0343775 | A1 | 11/2014 | Yamamoto et al. | |

* cited by examiner

| AT GEAR POSITION | C1 | C2 | B1 | B2 | F1 |
|---|---|---|---|---|---|
| 1st | ◯ | | | △ | ◯ |
| 2nd | ◯ | | ◯ | | |
| 3rd | ◯ | ◯ | | | |
| 4th | | ◯ | ◯ | | |

| OVERALL SPEED POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

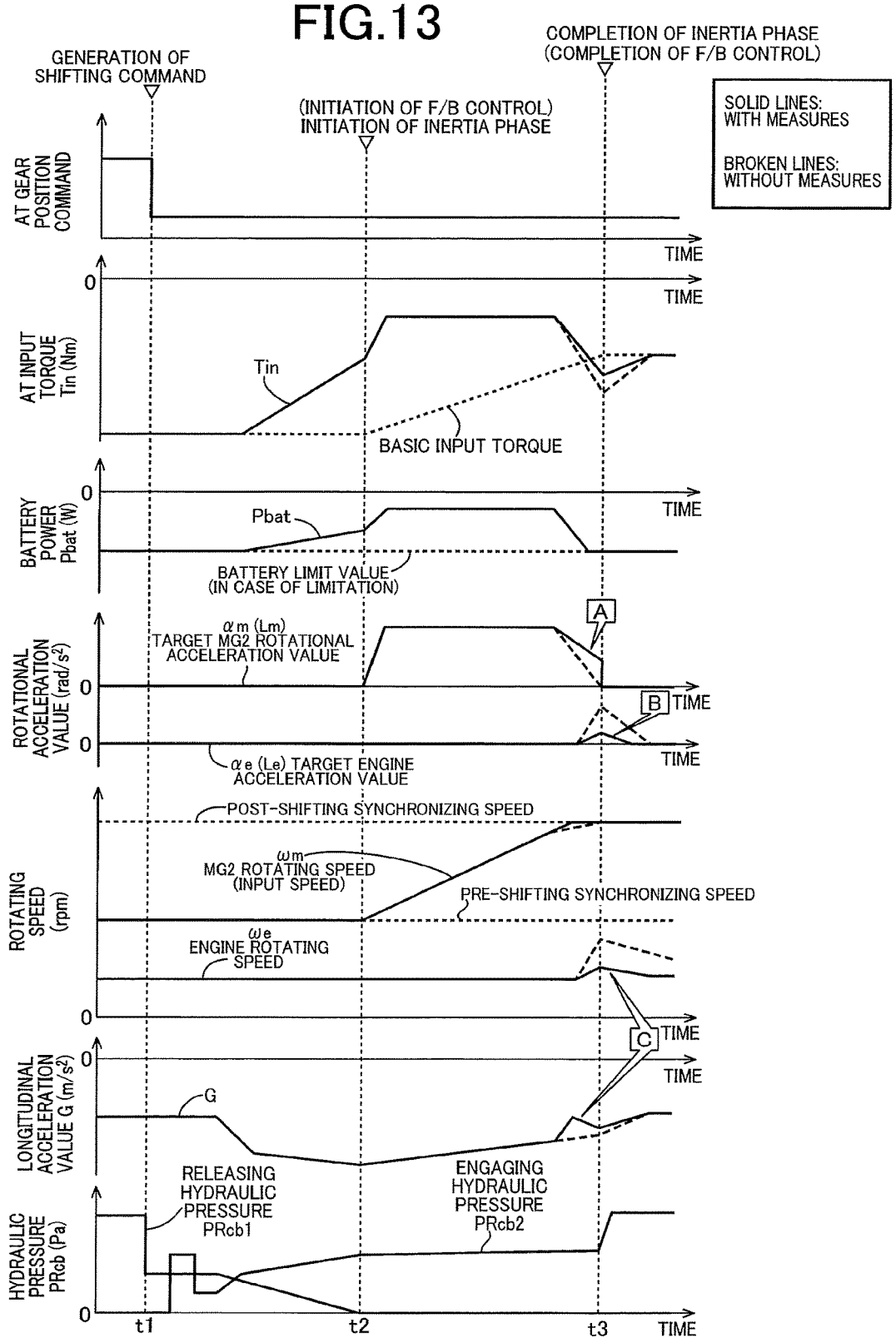

VEHICLE CONTROL APPARATUS

This application claims priority from Japanese Patent Application No. 2016-247202 filed on Dec. 20, 2016, the disclosure of which is herein incorporated by reference in its entirety.

FIELD OF THE INVENTION

The present invention relates to a control apparatus for a hybrid vehicle provided with a differential mechanism and a step-variable transmission that are disposed in series.

BACKGROUND OF THE INVENTION

There is well known a control apparatus for a hybrid vehicle provided with (i) an engine; (ii) a first motor/generator; (iii) a second motor/generator which is operatively connected to an intermediate power transmitting member; (iv) a differential mechanism having three rotary elements to which the engine, first motor/generator and intermediate power transmitting member are respectively connected; (v) a step-variable transmission which constitutes a part of a power transmitting path between the intermediate power transmitting member and drive wheels and which is placed in a selected one of a plurality of speed positions with engagement of a selected one or ones of a plurality of coupling devices; and (vi) an electric power storage device to and from which an electric power is supplied from and to the first motor/generator and the second motor/generator. A hybrid vehicle disclosed in JP-2014-223888A is an example of this type of vehicle. This document discloses a technique of, upon a shifting action of the step-variable transmission, controlling a torque of the first motor/generator and a torque of the second motor/generator, based on a torque of the engine and a torque capacity of the step-variable transmission, such that a rotational acceleration value of the second motor/generator and a rotational acceleration value of the engine coincide with respective target values, wherein each of the target values is compensated in a manner that satisfies a certain limitation applied to the target value. The limitation is determined, for example, depending on a condition required to protect the electric power storage device. The target value is compensated to be within a range between upper and lower limits that are determined depending on a maximum discharging amount and a maximum charging amount of the electric power storage device, when the target value is outside the range between the upper and lower limits.

In JP-2014-223888A, each of the target values is compensated when the target value is outside the range between the upper and lower limits. However, it is difficult to precisely know or grasp a target trajectory that is to be followed by each of the target value during the shifting action of the step-variable transmission, and accordingly difficult to satisfy shifting performance requirements such as shifting shock reduction and shifting responsiveness.

SUMMARY OF THE INVENTION

The present invention was made in view of the background art described above. It is therefore an object of the present invention to provide a control apparatus for such a hybrid vehicle described above, which is capable of satisfying the shifting performance requirements even when a power of the electric power storage device is limited.

The object indicated above is achieved according to the following modes of the present invention:

According to a first mode of the invention, there is provided a control apparatus for a vehicle provided with: (i) an engine; (ii) a first motor/generator; (iii) a second motor/generator which is operatively connected to an intermediate power transmitting member; (iv) a differential mechanism having a first rotary element to which the engine is operatively connected, a second rotary element to which the first motor/generator is operatively connected, and a third rotary element to which the intermediate power transmitting member is connected; (v) a step-variable transmission which constitutes a part of a power transmitting path between the intermediate power transmitting member and drive wheels and which is placed in a selected one of a plurality of speed positions with engagement of a selected one or ones of a plurality of coupling devices; and (vi) an electric power storage device to and from which an electric power is supplied from and to the first motor/generator and the second motor/generator. The control apparatus includes: a transmission shifting control portion configured to implement a shifting action of the step-variable transmission from one of the plurality of speed positions to another of the plurality of speed positions, by controlling a releasing action of a releasing coupling device and an engaging action of an engaging coupling device, the releasing coupling device being one of the plurality of coupling devices which has been placed in an engaged state before initiation of the shifting action, the engaging coupling device being another of the plurality of coupling devices which is to be placed in the engaged state after completion of the shifting action; a hybrid control portion configured to control an output torque of the first motor/generator and an output torque of the second motor/generator, based on an output torque of the engine and a transmitted torque to be transmitted through an initiative coupling device that is one of the releasing coupling device and the engaging coupling device, which causes the shifting action to progress, such that a rotational acceleration value of the second motor/generator and a rotational acceleration value of the engine are changed along respective target trajectories during the shifting action of the step-variable transmission (in other word, such that the rotational acceleration value of the second motor/generator and the rotational acceleration value of the engine represent respective target behaviors during the shifting action of the step-variable transmission); and a target-trajectory setting portion configured to set the target trajectories (or the target behaviors) of the rotational acceleration value of the second motor/generator and the rotational acceleration value of the engine, based on a maximum charging amount of the electric power that can be charged to the electric power storage device and a maximum discharging amount of the electric power that can be discharged from the electric power storage device. It is preferable that, during a power-on shift-up action of the step-variable transmission which is performed with an accelerating member of the vehicle being placed in an operated position, or during a power-off shift-down action of the step-variable transmission which is performed with the accelerating member being placed in a non-operated position, the hybrid control portion is configured to control the output torque of the first motor/generator and the output torque of the second motor/generator, based on the output torque of the engine and the transmitted torque to be transmitted through the engaging coupling device as the initiative coupling device. It is also preferable that, during a power-off shift-up action of the step-variable transmission which is performed with the accelerating member being placed in the non-operated position, or during a power-on shift-down action of the step-variable transmission which is performed with the accelerating member being placed in the operated position, the hybrid control portion is configured to control the output torque of the first motor/generator and the output torque of the second motor/generator, based on the output torque of the engine and the transmitted torque to be transmitted through the releasing coupling device as the initiative coupling device.

According to a second mode of the invention, in the control apparatus according to the first mode of the invention, the target-trajectory setting portion is configured, when the power-off shift-up action of the step-variable transmission is implemented with the maximum charging amount of the electric power being not larger than a lower limit value (namely, with the maximum charging amount being limited), to shift the target trajectory of the rotational acceleration value of the engine toward a positive side, as compared with when the power-off shift-up action is implemented with the maximum charging amount being larger than the lower limit value, such that a rotating speed of the second motor/generator is changed substantially in the same manner as when the power-off shift-up action is implemented with the maximum charging amount being larger than the lower limit value.

According to a third mode of the invention, in the control apparatus according to the second mode of the invention, the hybrid control portion is configured to suspend supply of fuel to the engine, when the power-off shift-up action of the step-variable transmission is implemented with the maximum charging amount of the electric power being not larger than the lower limit value.

According to a fourth mode of the invention, in the control apparatus according to the second or third mode of the invention, the transmission shifting control portion is configured to increase a torque capacity of the step-variable transmission, when the power-off shift-up action of the step-variable transmission is implemented with the maximum charging amount of the electric power being not larger than the lower limit value (namely, with the maximum charging amount being limited) and without supply of fuel to the engine being suspended.

According to a fifth mode of the invention, in the control apparatus according to the first through fourth modes of the invention, the target-trajectory setting portion is configured, when the power-off shift-up action of the step-variable transmission is implemented with the maximum discharging amount of the electric power being not larger than a lower limit value (namely, with the maximum discharging amount being limited), to shift the target trajectory of the rotational acceleration value of the second motor/generator toward a negative side, as compared with when the power-off shift-up action is implemented with the maximum discharging amount being larger than the lower limit value, such that a rotating speed of the engine is changed substantially in the same manner as when the power-off shift-up action is implemented with the maximum discharging amount being larger than the lower limit value.

According to a sixth mode of the invention, in the control apparatus according to the first through fifth modes of the invention, the target-trajectory setting portion is configured, when the power-off shift-down action of the step-variable transmission is implemented with the maximum charging amount of the electric power being not larger than a lower limit value (namely, with the maximum charging amount being limited), to shift the target trajectory of the rotational acceleration value of the second motor/generator toward a positive side, as compared with when the power-off shift-down action is implemented with the maximum charging amount being larger than the lower limit value, such that a rotating speed of the engine at a stage at which a difference between an input speed of the step-variable transmission and a post-shifting synchronizing speed becomes not larger than a predetermined value, is changed substantially in the same manner as when the power-off shift-down action is implemented with the maximum charging amount being larger than the lower limit value.

According to a seventh mode of the invention, in the control apparatus according to the first through sixth modes of the invention, the target-trajectory setting portion is configured, when the power-on shift-up action of the step-variable transmission is implemented with the maximum discharging amount of the electric power being not larger than a lower limit value (namely, with the maximum discharging amount being limited), to shift the target trajectory of the rotational acceleration value of the second motor/generator toward a negative side, as compared with when the power-on shift-up action is implemented with the maximum discharging amount being larger than the lower limit value, such that a rotating speed of the engine is changed substantially in the same manner as when the power-on shift-up action is implemented with the maximum discharging amount being larger than the lower limit value.

In the control apparatus according to the first mode of the invention, when it is predicted that the rotational acceleration value of the second motor/generator and the rotational acceleration value of the engine cannot be changed along respective standard target trajectories, due to conditions relating to limitations of the maximum charging amount and the maximum discharging amount of the electric power of the electric power storage device, it is possible to modify the standard target trajectories, namely, set suitable target trajectories which are predetermined depending on the conditions and which satisfy shifting performance requirements. Thus, the output torque of the first motor/generator and the output toque of the second motor/generator can be controlled such that the rotational acceleration value of the second motor/generator and the rotational acceleration value of the engine are changed along the target trajectories that are set as described above, so that it is possible to satisfy the shifting performance requirements even in presence of the limitations of the maximum charging and discharging amounts of the electric power of the electric power storage device.

In the control apparatus according to the second mode of the invention, when the maximum charging amount of the electric power storage device is limited during the power-off shift-up action of the step-variable transmission, the target trajectory of the rotational acceleration value of the engine is shifted toward a positive side as compared with when the maximum charging amount of the electric power storage device is not limited such that the rotating speed of the second motor/generator is changed substantially in the same manner as when the maximum charging amount of the electric power storage device is not limited. Thus, although the rotating speed of the engine reaches a target speed at a later point of time, the rotating speed of the second motor/generator can be changed along the same trajectory as in a case without limitation of the maximum charging amount. Therefore, a delay of the shifting action can be reduced thereby making possible to reducing a shifting shock that could be caused, particularly, by a backup control, which is executed to forcibly cause the engaging coupling device to be placed in its engaged state when the shifting action is delayed. Further, it is possible to reduce delay of generation of an engine brake, which could be caused by the delay of the shifting action.

In the control apparatus according to the third mode of the invention, when the maximum charging amount of the electric power storage device is limited during the power-off shift-up action of the step-variable transmission, the fuel cut is executed for suspending the fuel supply to the engine, so that an inertia power can be consumed by an engine friction that is caused by the fuel cut, and the shifting action can be caused to progress.

In the control apparatus according to the fourth mode of the invention, when the maximum charging amount of the electric power storage device is limited and the fuel cut of the engine is not executed during the power-off shift-up action of the step-variable transmission, the torque capacity of the step-variable transmission is generated or increased thereby causing a drag in the step-variable transmission, so that an inertia energy is consumed by the drag caused in the step-variable transmission thereby making it possible to cause the shifting action to progress.

In the control apparatus according to the fifth mode of the invention, when the maximum discharging amount of the electric power storage device is limited and the fuel cut of the engine is executed during the power-off shift-up action of the step-variable transmission, the target trajectory of the rotational acceleration value of the second motor/generator is shifted toward a negative side as compared with when the maximum discharging amount is not limited, such that the rotating speed of the engine is changed substantially in the same manner as when the maximum discharging amount is not limited. Thus, the progress of the shifting action can be accelerated whereby an excessive reduction of the rotating speed of the engine can be restrained.

In the control apparatus according to the sixth mode of the invention, when the maximum charging amount of the electric power storage device is limited during the power-off shift-down action of the step-variable transmission, the target trajectory of the rotational acceleration value of the second motor/generator is shifted toward a positive side as compared with when the maximum charging amount is not limited, such that the rotating speed of the engine at the stage at which the difference between the input speed of the step-variable transmission and the post-shifting synchronizing speed becomes not larger than the predetermined value, is changed substantially in the same manner as when the maximum charging amount is not limited. Thus, the rotating speed of the second motor/generator is increased in the vicinity of completion of the shifting action, for thereby consuming an inertia power and making possible to restrain the rotating speed of the engine from being increased.

In the control apparatus according to the seventh mode of the invention, when the maximum discharging amount of the electric power storage device is limited during the power-on shift-up action of the step-variable transmission, the target trajectory of the rotational acceleration value of the second motor/generator is shifted toward a negative side as compared with when the maximum discharging amount is not limited, such that the rotating speed of the engine is changed substantially in the same manner as when the maximum discharging amount is not limited. Thus, the progress of the shifting action can be accelerated whereby an excessive reduction of the rotating speed of the engine can be restrained.

BRIEF DESCRIPTION OF THE DRAWINGS

FIG. 13 is a time chart illustrating an example of a control operation executed as shown in the flow chart of FIG. 10, for explaining a control status during a power-on shift-down action of the step-variable transmission portion implemented in a case in which the maximum charging amount of the battery is limited.

DETAILED DESCRIPTION OF PREFERRED EMBODIMENT

Hereinafter, some embodiments of the invention will be described in detail with reference to the accompanying drawings. The figures of the drawings are simplified or deformed as needed and portions are not necessarily precisely depicted in terms of dimension ratio, shape, etc.

Embodiment

Figure 1:
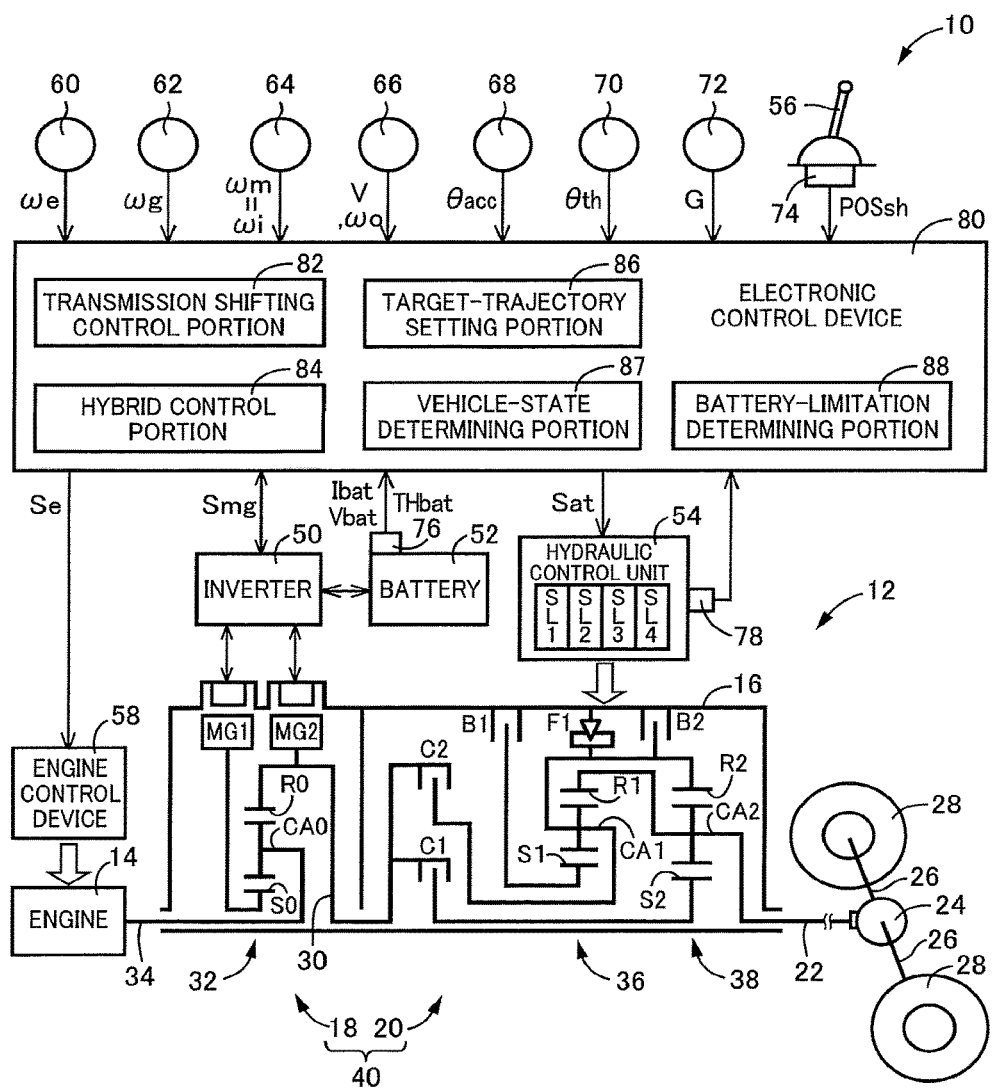
FIG. 1 is a schematic view showing an arrangement of a drive system of a vehicle to be controlled by a control apparatus according to the present invention, and major control functions and control portions of the control apparatus.

Reference is first made to FIG. 1, which is the schematic view showing an arrangement of a drive system 12 of a vehicle 10 to be controlled by a control apparatus according to the present invention, and major portions of the control apparatus to perform various controls of the vehicle 10. As shown in FIG. 1, the vehicular drive system 12 is provided with an engine 14, an electrically controlled continuously variable transmission portion 18 (hereinafter referred to as "continuously variable transmission portion 18") connected directly or indirectly via a damper (not shown) or any other device to the engine 14, and a mechanically operated step-variable transmission portion 20 (hereinafter referred to as "step-variable transmission portion 20") connected to an output rotary member of the continuously variable transmission portion 18. The continuously variable transmission portion 18 and the step-variable transmission portion 20 are disposed in series with each other within a transmission casing 16 (hereinafter referred to as "casing 16") functioning as a non-rotative member fixed to a vehicle body, such that the transmission portions 18 and 20 are disposed coaxially with each other on a common axis. The vehicular drive system 12 is further provided with a differential gear mechanism 24 connected to an output rotary member of the step-variable transmission portion 20 in the form of an output shaft 22, and a pair of axles 26 connected to the differential gear mechanism 24. In the vehicular drive system 12, a drive force ("drive torque" or "drive power" unless otherwise distinguished from the drive force) of the engine 14 and a second motor/generator MG2 (described below) is transmitted to the step-variable transmission portion 20, and is transmitted from the step-variable transmission portion 20 to drive wheels 28 of the vehicle 10 through the differential gear mechanism 24 and other devices. The vehicular drive system 12 is suitably used in the vehicle 10 of an FR type (front-engine rear-drive type) in which the axis of the engine 14 is parallel to the longitudinal direction of the vehicle 10. It is noted that the continuously variable transmission portion 18 and the step-variable transmission portion 20 are constructed substantially symmetrically with each other about the axis of the engine 14 (about the above-indicated common axis, and that FIG. 1 does not show the lower halves of the transmission portions 18 and 20.

The engine 14 is the drive power source to drive the vehicle 10, which is a known internal combustion engine such as a gasoline engine or a diesel engine. An engine torque Te which is an output torque of this engine 14, is controlled by an electronic control device 80 (described below) which controls the operating condition of the engine 14 as represented by an opening angle of a throttle valve or an intake air quantity, an amount of injection of a fuel and an ignition timing. In the present embodiment, the engine 14 is connected to the continuously variable transmission portion 18, without a fluid-operated type power transmitting device such as a torque converter or a fluid coupling being disposed between the engine 14 and the transmission portion 18.

The continuously variable transmission portion 18 is provided with: a first motor/generator MG1; a differential mechanism 32 functioning as a power distributing device to mechanically distribute the drive force of the engine 14 to the first motor/generator MG1, and to an intermediate power transmitting member 30 which is an output rotary member of the continuously variable transmission portion 18; and a second motor/generator MG2 operatively connected to the intermediate power transmitting member 30. The continuously variable transmission portion 18 is an electrically controlled continuously variable transmission wherein a differential state of the differential mechanism 32 is controllable by controlling an operating state of the first motor/generator MG1. The first motor/generator MG1 functions as a differential motor/generator (a differential electric motor) while the second motor/generator MG2 is an electric motor which functions as a drive power source, namely, a vehicle driving motor/generator (a vehicle driving electric motor). The vehicle 10 is a hybrid vehicle provided with the drive power source in the form of the engine 14 and the second motor/generator MG2.

Each of the first motor/generator MG1 and the second motor/generator MG2 is an electrically operated rotary device having a function of an electric motor and a function of an electric generator. The first motor/generator MG1 and the second motor/generator MG2 are connected to an electric power storage device in the form of a battery 52 through an inverter 50. The inverter 50 provided on the vehicle 10 is controlled by the control apparatus in the form of the above-indicated electronic control device 80 described below in detail, to control an output torque (regenerative torque) of the first motor/generator MG1, namely, an MG1 torque Tg, and an output torque (forward driving torque) of the second motor/generator MG2, namely, an MG2 torque Tm. The battery 52 also provided on the vehicle 10 is the electric power storage device to and from which an electric power is supplied from and to the first motor/generator MG1 and the second motor/generator MG2.

The differential mechanism 32 is a planetary gear set of a single-pinion type having a sun gear S0 functioning as a second rotary element RE2, a carrier CA0 functioning as a first rotary element RE1 and a ring gear R0 functioning as a third rotary element RE3. The carrier CA0 is operatively connected to the engine 14 through a connecting shaft 34 in a power transmittable manner, and the sun gear S0 is operatively connected to the first motor/generator MG1 in a power transmittable manner, while the ring gear R0 is operatively connected to the intermediate power transmitting member 30 and the second motor/generator MG2 in a power transmittable manner. In the differential mechanism 32, the carrier CA0 functions as an input rotary element, and the sun gear S0 functions as a reaction rotary element, while the ring gear R0 functions as an output rotary element.

The step-variable transmission portion 20 is a step-variable transmission which constitutes a part of a power transmitting path between the intermediate power transmitting member 30 and the drive wheels 28. The intermediate power transmitting member 30 also functions as an input rotary member of the step-variable transmission portion 20. The step-variable transmission portion 20 is considered to also constitute a part of a power transmitting path between the second motor/generator MG2 and the drive wheels 28, since the second motor/generator MG2 is connected to the intermediate power transmitting member 30 such that the intermediate power transmitting member 30 is rotated together with the second motor/generator MG2. The step-variable transmission portion 20 is a known automatic transmission of a planetary gear type which is provided with a plurality of planetary gear sets in the form of a first planetary gear set 36 and a second planetary gear set 38, and a plurality of coupling devices in the form of a clutch C1, a clutch C2, a brake B1 and a brake B2 (hereinafter referred to as "coupling devices CB" unless otherwise specified).

Each of the coupling devices CB is a hydraulically operated frictional coupling device in the form of a multiple-disc type or a single-disc type clutch or brake that is operatively pressed by a hydraulic actuator, or a band brake that is operatively tightened by a hydraulic actuator. The coupling devices CB are selectively placed in engaged, slipped or released states with their torque capacities (engaging torque values or transmitted torque values) Tcb being changed according to engaging hydraulic pressures PRcb applied thereto, which are regulated by respective solenoid-operated valves SL1-SL4 incorporated within a hydraulic control unit 54. In order for each coupling device CB to be able to transmit a torque (for example, an AT input torque Ti which is an input torque of the step-variable transmission portion 20) between the intermediate power transmitting member 30 and the output shaft 22, without a slipping action (without a speed difference between input and output elements of the coupling device CB), the relevant coupling device CB should be given an engaging torque Tcb enough to permit transmission of a component of the input torque, which is assigned to be transmitted by the coupling device CB in question, that is, to permit transmission of an assigned torque (transmitted torque) to be transmitted through an engaging action of the coupling device CB. However, it is noted that an increase of the engaging torque Tcb enough to obtain the transmitted torque does not cause an increase of the transmitted torque. That is, the engaging torque Tcb is equivalent to a maximum value of the torque that can be transmitted through the coupling device CB, and the transmitted torque is equivalent to the torque that is actually transmitted through the coupling device CB. Therefore, the engaging torque Tcb and the transmitted torque are equal to each other in the process of the engaging action of the coupling device CB with a speed difference between its input and output elements. In the present embodiment, the transmitted torque in the process of a shifting action of the step-variable transmission portion 20 with a speed difference of the input and output elements (for example, the transmitted torque during an inertia phase of the shifting action) is represented by the engaging torque Tcb (namely, transmitted torque Tcb). It is noted that the engaging torque (transmitted torque) Tcb and the engaging hydraulic pressure PRcb are proportional to each other, before the engaging hydraulic pressure PRcb has been raised to initiate an engaging contact of the input and output elements with each other.

In the step-variable transmission portion 20, selected ones of rotary elements (sun gears S1 and S2, carriers CA1 and CA2, and ring gears R1 and R2) of the first and second planetary gear sets 36 and 38 are connected to each other or to the intermediate power transmitting member 30, casing 16 or output shaft 22, either directly or indirectly (selectively) through the coupling devices CB or a one-way clutch F1.

The step-variable transmission portion 20 is shifted to a selected one of four AT gear positions (speed positions) by engaging actions of selected ones of the coupling devices CB. These four AT gear positions have respective different speed ratios γat (=AT input speed ωi/AT output speed ωo). Namely, the step-variable transmission portion 20 is shifted up and down from one gear position to another by placing selected ones of the coupling devices CB in the engaged state. The AT input speed ωi is a rotating speed (angular velocity) of the input rotary member of the step-variable transmission portion 20, that is, a rotating speed of the intermediate power transmitting member 30, which is equal to an MG2 rotating speed ωm which is an operating speed of the second motor/generator MG2. Thus, the AT input speed ωi can be represented by the MG2 rotating speed ωm. The AT output speed ωo is a rotating speed of the output shaft 22 of the step-variable transmission portion 20, which is considered to be an output speed of a transmission device 40 which consists of the continuously variable transmission portion 18 and the step-variable transmission portion 20.

Figures 2, 3:
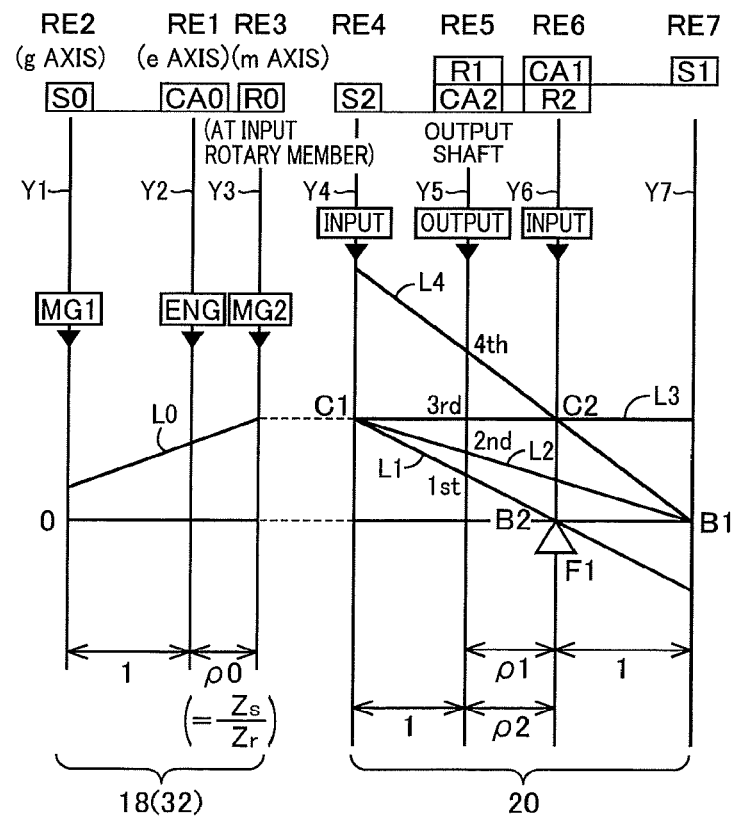
FIG. 2 is a table indicating a relationship between gear positions of a mechanically operated step-variable transmission portion shown in FIG. 1 and combinations of coupling devices placed in engaged states to establish the respective gear positions.
FIG. 3 is a collinear chart indicating a relationship among rotating speeds of rotary elements of an electrically controlled continuously variable transmission portion and the mechanically operated step-variable transmission portion.

Reference is now made to FIG. 2, which is the table indicating the relationship between the first through fourth speed AT gear positions of the step-variable transmission portion 20 shown in FIG. 1 and combinations of the coupling devices CB placed in the engaged states to establish the respective AT gear positions. In the table, the four forward AT gear positions are respectively represented by "$1^{st}$", "$2^{nd}$", "$3^{rd}$" and "$4^{th}$". The first speed AT gear position "$1^{st}$" has a highest speed ratio γat, and the speed ratios γat of the four AT gear positions decrease in the direction from the first speed AT gear position (lowest-speed gear position) "$1^{st}$" toward the fourth speed AT gear position (highest-speed gear position) "$4^{th}$". In the table, "O" indicates the engaged state of the coupling devices CB, "Δ" indicates the engaged state of the coupling device B2 during application of an engine brake to the vehicle 10 or during a shift-down action of the step-variable transmission portion 20 while the vehicle 10 is in a coasting run, while the blank indicates the released state of the coupling devices CB. The one-way clutch F1 indicated above is disposed in parallel to the brake B2 which is placed in the engaged state to establish the first speed AT gear position "$1^{st}$", so that the brake B2 is not required to be placed in the engaged state upon starting or acceleration of the vehicle 10. The above-indicated shift-down action of the step-variable transmission portion 20 in the coasting run of the vehicle 10 is kind of a "power-off shift-down action" which is required as a result of reduction of a vehicle-speed-related value (vehicle running speed V, for example) due to reduction of a required drive force (as represented by an operation amount θacc of an accelerator pedal) or during deceleration of the vehicle 10 in a released position of the accelerator pedal (with the operation amount θacc of the accelerator pedal being zero or substantially zero), and is a shift-down action which is required during deceleration of the vehicle 10 in the released position of the accelerator pedal. It is noted that the step-variable transmission portion 20 is placed in a neutral position (a power transmission cutoff state) when all of the coupling devices CB are placed in the released states.

The step-variable transmission portion 20 is shifted up or down to establish a newly selected one of the four AT gear positions, according to the operation amount θacc of the accelerator pedal and the vehicle running speed V, with a releasing action of one of the coupling devices CB and a concurrent engaging action of another coupling device CB, which concurrent releasing and engaging actions are controlled by the above-indicated electronic control device 80, more specifically, by a transmission shifting control portion 82 configured to control shifting actions of the step-variable transmission portion 20. The above-indicated one coupling device CB (i.e., releasing coupling device) was placed in the engaged state before the step-variable transmission portion 20 is shifted to establish the newly selected AT gear position, while the above-indicated another coupling device CB (i.e., engaging coupling device) is placed in the engaged state while the step-variable transmission portion 20 is placed in the newly selected AT gear position. Thus, the step-variable transmission portion 20 is shifted up or down from one of the AT gear positions to another by so-called "clutch-to-clutch" shifting operation, namely, concurrent releasing and engaging actions of the selected two coupling devices CB. For instance, the step-variable transmission portion 20 is shifted down from the second speed AT gear position "$2^{nd}$" to the first speed AT gear position "$1^{st}$", with the releasing action of the brake B1 and the concurrent engaging action of the brake B2, as indicated in the table of FIG. 2. In this instance, the hydraulic pressures applied to the brakes B1 and B2 are transiently controlled to bring these brakes B1 and B2 into the released and engaged states, respectively.

The collinear chart of FIG. 3 indicates a relationship among rotating speeds of the rotary elements of the continuously variable transmission portion 18 and the step-variable transmission portion 20. In this collinear chart, three vertical lines Y1, Y2 and Y3 corresponding to the respective three rotary elements of the differential mechanism 32 of the continuously variable transmission portion 18 respectively represent a "g" axis representing the rotating speed of the second rotary element RE2 in the form of the sun gear S0, an "e" axis representing the rotating speed of the first rotary element RE1 in the form of the carrier CA0, and an "m" axis representing the rotating speed of the third rotary element RE3 in the form of the ring gear R0 (i.e., the input rotating speed of the step-variable transmission portion 20). Further, four vertical lines Y4, Y5, Y6 and Y7 corresponding to the respective four rotary elements of the step-variable transmission portion 20 respectively represent an axis representing the rotating speed of the fourth rotary element RE4 in the form of the sun gear S2, an axis representing the rotating speed of the fifth rotary element RE5 in the form of the ring gear R1 and the carrier CA2 fixed to each other, namely, the rotating speed of the output shaft 22, an axis representing the rotating speed of the sixth rotary element RE6 in the form of the carrier CA1 and the ring gear R2 fixed to each other, and an axis representing the rotating speed of the seventh rotary element RE7 in the form of the sun gear S1. The distances between the adjacent ones of the vertical lines Y1, Y2 and Y3 are determined by a gear ratio ρ0 of the differential mechanism 32, while the distances between the adjacent ones of the vertical lines Y4-Y7 are determined by gear ratios ρ1 and ρ2 of the respective first and second planetary gear sets 36 and 38. Where the distance between the axis representing the rotating speed of the sun gear S0, S1, S2 and the axis representing the rotating speed of the carrier CA0, CA1, CA2 corresponds to "1", the distance between the axis representing the rotating speed of the carrier CA0, CA1, CA2 and the axis representing the rotating speed of the ring gear R0, R1, R2 corresponds to the gear ratio ρ of the planetary gear set (=number of teeth Zs of the sun gear/number of teeth Zr of the ring gear).

Referring to the collinear chart of FIG. 3, the differential mechanism 32 of the continuously variable transmission portion 18 is arranged such that the engine 14 (represented as "ENG" in the collinear chart) is connected to the first rotary element RE1, and the first motor/generator MG1 (represented as "MG1" in the collinear chart) is connected to the second rotary element RE2, while the second motor/generator MG2 (represented as "MG2" in the collinear chart) is connected to the third rotary element RE3 which is rotated together with the intermediate power transmitting member 30. Thus, a rotary motion of the engine 14 is transmitted to the step-variable transmission portion 20 through the intermediate power transmitting member 30. In a part of the collinear chart corresponding to the continuously variable transmission portion 18, a straight line L0 intersecting the vertical line Y2 represents a relationship between the rotating speeds of the sun gear S0 and the ring gear R0.

The step-variable transmission portion 20 is arranged such that the fourth rotary element RE4 is selectively connected to the intermediate power transmitting member 30 through the clutch C1, the fifth rotary element RE5 is connected to the output shaft 22, the sixth rotary element RE6 is selectively connected to the intermediate power transmitting member 30 through the clutch C2 and is selectively connected to the casing 16 through the brake B2, and the seventh rotary element RE7 is selectively connected to the casing 16 through the brake B1. In a part of the collinear chart corresponding to the step-variable transmission portion 20, straight lines L1, L2, L3 and L4 intersecting the vertical line Y5 represent the rotating speeds of the output shaft 22 in the respective first, second, third and fourth speed AT gear positions "$1^{st}$", "$2^{nd}$", "$3^{rd}$" and "$4^{th}$" that are selectively established by control for engaging and releasing the coupling devices CB.

Solid straight lines L0, L1, L2, L3 and L4 shown in the collinear chart of FIG. 3 indicate the relative rotating speeds of the rotary elements in a hybrid drive mode in which the vehicle 10 is driven in the forward direction with at least the engine 14 being operated as a drive power source. In the differential mechanism 32 during this hybrid drive mode, when a torque Te of the engine 14 (engine torque Te) is applied to the carrier CA0 while a reaction torque which is a negative torque generated by the first motor/generator MG1 operated in the positive direction is applied to the sun gear S0, a directly transmitted engine torque Td(=Te/(1+ρ)=−(1/ρ)*Tg) which is a positive torque is applied to the ring gear R0 and rotating the ring gear R0 in the positive direction. The vehicle 10 is driven in the forward direction with a vehicle drive torque which is a sum of the directly transmitted engine torque Td and the MG2 torque Tm and which is transmitted to the drive wheels 28 through the step-variable transmission portion 20 selectively placed in one of the first through fourth speed AT gear positions according to required vehicle drive force. At this time, the first motor/generator MG1 functions as an electric generator operated in the positive direction and generating a negative torque. An electric power Wg generated by the first motor/generator MG1 is stored in the battery 52 or consumed by the second motor/generator MG2. The second motor/generator MG2 is operated to generate the MG2 torque Tm, with all or a part of the electric power Wg generated by the first motor/generator MG1, or a sum of the generated electric power Wg and the electric power supplied from the battery 52.

In the differential mechanism 32 during a motor drive mode in which the vehicle 10 is driven with a drive force generated by the second motor/generator MG2 operated as a drive power source while the engine 14 is held at rest, the carrier CA0 is held stationary while the MG2 torque Tm which is a positive torque is applied to the ring gear R0 and rotating the ring gear R0 in the positive direction. The state of the differential mechanism in this motor drive mode is not shown in the collinear chart of FIG. 3. At this time, the first motor/generator MG1 connected to the sun gear S0 is placed in a non-load state and freely operated in the negative direction. Namely, in the motor drive mode, the engine 14 is held in non-operated state, so that an operating speed ωe of the engine 14 (engine rotating speed ωe) is kept zero, and the vehicle 10 is driven in the forward direction with the MG2 torque Tm (positive forward driving torque), which is transmitted as a forward drive torque to the drive wheels 28 through the step-variable transmission portion 20 placed in one of the first through fourth speed AT gear position. When the vehicle 10 is driven in the rearward direction, in the motor drive mode, for example, the MG2 torque Tm which is a negative torque is applied to the ring gear R0 and rotating the ring gear R0 in the negative direction, and is transmitted as rear drive torque of the vehicle 10 to the drive wheels 28 through the step-variable transmission portion 20 placed in the first speed AT gear position.

In the vehicular drive system 12, the continuously variable transmission portion 18 functions as an electrically controlled shifting mechanism (electrically controlled differential mechanism) provided with the differential mechanism 32 the differential state of which is controlled by controlling the operating state of the first motor/generator MG1, and which has the three rotary elements, that is, the first rotary element RE1 in the form of the carrier CA0 to which the engine 14 is operatively connected in a power transmittable manner, the second rotary element RE2 in the form of the sun gear S0 to which the first motor/generator MG1 is operatively connected in a power transmittable manner, and the third rotary element RE3 in the form of the ring gear R0 to which the intermediate power transmitting member 30 is connected (in other words, to which the second motor/generator MG2 is operatively connected). Namely, the continuously variable transmission portion 18 has the differential mechanism 32 to which the engine 14 is operatively connected in a power transmittable manner, and the first motor/generator MG1 to which the differential mechanism 32 is operatively connected in a power transmittable manner, and the operating state of which is controlled to control the differential state of the differential mechanism 32. The continuously variable transmission portion 18 is operated as an electrically controlled continuously variable transmission a speed ratio $\gamma 0$ ($=\omega e/\omega m$) of which is variable. The speed ratio is a ratio of rotating speed of the connecting shaft 34 (namely, engine rotating speed $\omega e$) to the rotating speed of the intermediate power transmitting member 30 (namely, MG2 rotating speed $\omega m$).

In the hybrid drive mode, for instance, the rotating speed of the sun gear S0 is raised or lowered by controlling operating speed of the first motor/generator MG1 while the rotating speed of the ring gear R0 is determined by rotating speed of the drive wheels 28 with the step-variable transmission portion 20 placed in one of the AT gear positions, so that the rotating speed of the carrier CA0 (namely, engine rotating speed $\omega e$) is accordingly raised or lowered. In running with operation of the engine 14, therefore, the engine 14 can be operated at an efficient operating point. That is, the step-variable transmission portion 20 to be placed in a selected one of the AT gear positions and the continuously variable transmission portion 18 functioning as a continuously variable transmission cooperate to provide the transmission device 40 in which the continuously variable transmission portion 18 (differential mechanism 32) and the step-variable transmission portion 20 are disposed in series with each other and which functions as a continuously variable transmission as a whole.

Alternatively, the continuously variable transmission portion 18 can be shifted like a step-variable transmission. Accordingly, the transmission device 40 constituted by the step-variable transmission portion 20 to be placed in one of the AT gear positions and the continuously variable transmission portion 18 which can be shifted like the step-variable transmission can be shifted like a step-variable transmission as a whole. That is, the step-variable transmission portion 20 and the continuously variable transmission portion 18 can be controlled to selectively establish a plurality of speed positions (hereinafter referred to as "overall speed positions" although it may be referred also to as "conceptual speed positions") having respective different values of a speed ratio $\gamma t$ ($=\omega e/\omega o$) which is a ratio of the engine rotating speed $\omega e$ to the output speed $\omega o$. The speed ratio $\gamma t$ is an overall speed ratio of the transmission device 40 consisting of the continuously variable transmission portion 18 and the step-variable transmission portion 20 which are disposed in series with each other. The overall speed ratio $\gamma t$ is equal to a product of the speed ratio $\gamma 0$ of the continuously variable transmission portion 18 and the speed ratio $\gamma at$ of the step-variable transmission portion 20, namely, $\gamma t = \gamma 0 * \gamma at$.

Figures 4, 5:
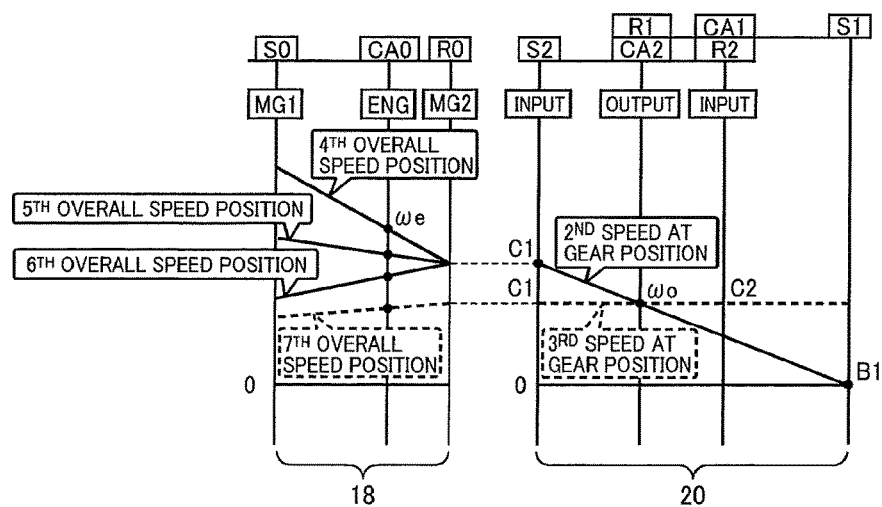
FIG. 4 is a table indicating an example of a plurality of overall speed positions of a transmission device in relation to the gear positions of the step-variable transmission portion.
FIG. 5 is a view indicating some examples of the gear positions of the step-variable transmission portion and some examples of the overall speed positions of the transmission device, on a collinear chart similar to that of FIG. 3.

At least one overall speed position is provided for each of the four AT gear positions of the step-variable transmission portion 20, with a combination of each AT gear position with at least one of the different speed ratio values $\gamma 0$ of the continuously variable transmission portion 18. FIG. 4 is the table indicating an example of the overall speed positions of the transmission device 40, wherein first through third overall speed positions are established for the first speed AT gear position, fourth through sixth overall speed positions are established for the second speed AT gear position, the seventh through ninth overall speed positions are established for the third speed AT gear position, and a tenth overall speed position is established for the fourth speed AT gear position.

FIG. 5 is the view indicating some examples of the AT gear positions of the step-variable transmission portion 20 and some examples of the overall speed positions of the transmission device 40, on a collinear chart similar to that of FIG. 3. In FIG. 5, solid lines indicate the fourth through sixth overall speed positions established when the step-variable transmission portion 20 is placed in the second speed AT gear position. In the transmission device 40, the continuously variable transmission portion 18 is controlled to control the engine rotating speed $\omega e$ with respect to the output speed $\omega o$ for establishing the predetermined overall speed ratio values $\gamma t$, to thereby establish the different overall speed position or positions for each of the AT gear positions. A broken line indicates the seventh overall speed position established when the step-variable transmission portion 20 is placed in the third speed AT gear position. In the transmission device 40, the continuously variable transmission portion 18 is controlled according to the selected one of the AT gear positions, for shifting the transmission device 40 from one of the overall speed positions to another.

Referring back to FIG. 1, the vehicle 10 is provided with the control apparatus in the form of the electronic control device 80 configured to control various devices of the vehicle 10 such as the engine 14, continuously variable transmission portion 18 and step-variable transmission portion 20. FIG. 1 is the view showing input and output signals of the electronic control device 80, and is a functional block diagram showing major control functions and control portions of the electronic control device 80. For example, the electronic control device 80 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control device 80 may be constituted by two or more control units exclusively assigned to perform different control operations such as engine control operations and transmission shifting control operations.

The electronic control device 80 receives various input signals such as: an output signal of an engine speed sensor 60 indicative of the engine rotating speed ωe; an output signal of an MG1 speed sensor 62 indicative of the MG1 speed ωg which is the operating speed of the first motor/generator MG1; an output signal of an MG2 speed sensor 64 indicative of the MG2 rotating speed ωm which is the AT input speed ωi; an output signal of an output speed sensor 66 indicative of the output speed ωo corresponding to the vehicle running speed V; an output signal of an accelerator pedal operation amount sensor 68 indicative of the operation amount θacc of a vehicle accelerating member in the form of the accelerator pedal, which operation amount θacc represents a degree of acceleration of the vehicle 10 required by a vehicle operator; an output signal of a throttle valve opening angle sensor 70 indicative of an angle θth of opening of an electronic throttle valve; an output signal of an acceleration sensor 72 indicative of a longitudinal acceleration value G of the vehicle 10; an output signal of a shift position sensor 74 indicative of an operating position POSsh of a manually operated shifting member in the form of a shift lever 56 provided in the vehicle 10; output signals of a battery sensor 76 indicative of a temperature THbat, a charging/discharging electric current Ibat and a voltage Vbat of the battery 52; and an output signal of an oil temperature sensor 78 indicative of a temperature THoil of a working fluid used for operating hydraulic actuators of the coupling devices CB.

Further, the electronic control device 80 generates various output signals such as: an engine control command signal Se to be applied to an engine control device 58 provided to control a throttle actuator, an fuel injecting device and an ignition device, for controlling the engine 14; motor/generator control command signals Smg to be applied to the inverter 50, for controlling the first motor/generator MG1 and the second motor/generator MG2; and hydraulic control command signals Sat to be applied to the hydraulic control unit 54, for controlling the operating states of the coupling devices CB (namely, for controlling the shifting actions of the step-variable transmission portion 20). The hydraulic control command signals Sat are command signals (drive currents) to be applied to the hydraulic control unit 54 for controlling amounts of electric currents to be applied to the solenoid-operated valves SL1-SL4 which regulate the engaging hydraulic pressure PRcb to be applied to each of the hydraulic actuators of the coupling devices CB. The electronic control device 80 operates to set a hydraulic pressure command value (command pressure) corresponding to the engaging hydraulic pressure PRcb to be applied to each of the hydraulic actuators, for establishing a target value of the engaging torque Tcb of the corresponding coupling device CB, and outputs a drive current corresponding to the hydraulic pressure command value.

The electronic control device 80 is configured to calculate a charging state (stored electric power amount) SOC of the battery 52 on the basis of the charging/discharging electric current Ibat and the voltage Vbat of the battery 52. The electronic control device 80 is further configured to calculate, based on, for example, the temperature THbat and the charging state SOC of the battery 52, a maximum charging amount Win of electric power that can be charged to the battery 52, and a maximum discharging amount Wout of electric power that can be discharged from the battery 52, which maximum charging and discharging amounts Win and Wout define a range of an electric power Pbat of the battery 52 that can be used. The calculated maximum charging and discharging amounts Win and Wout decrease with a decrease of the battery temperature THbat when the battery temperature THbat is lower than a normal level, and decrease with an increase of the battery temperature THbat when the battery temperature THbat is higher than the normal level. Further, the maximum charging amount Win decreases with an increase of the stored electric power amount SOC when the stored electric power amount SOC is relatively large. The maximum discharging amount Wout decreases with a decrease of the stored electric power amount SOC when the stored electric power amount SOC is relatively small.

The electronic control device 80 includes a shift control means or portion in the form of a transmission shifting control portion 82, and a hybrid control means or portion in the form of a hybrid control portion 84, for performing various controls in the vehicle 10.

The transmission shifting control portion 82 is configured to determine a shifting action of the step-variable transmission portion 20 according to a memory-stored AT gear position shifting map obtained by experimentation or determined by an appropriate design theory, and applies the hydraulic control command signals Sat to the hydraulic control unit 54, for commanding the solenoid-operated valves SL1-SL4 to bring the appropriate ones of the coupling devices CB into the released and engaged states, for automatically shifting up or down the step-variable transmission portion 20. The AT gear position shifting map indicated above is a predetermined relationship between two variables in the form of the output speed ωo (equivalent to the vehicle running speed V) and the accelerator pedal operation amount θacc (equivalent to a required drive torque Tdem and the throttle valve opening angle θth), which relationship is used to determine a shifting action of the step-variable transmission portion 20 and is represented by shift-up and shift-down shifting lines in a two-dimensional coordinate system in which the output speed ωo and the accelerator pedal operation amount θacc are taken along respective two axes. The transmission shifting control portion 82 is configured to implement a shifting action of the step-variable transmission portion 20 so as to switch from one of the speed positions to another of the speed positions, by controlling the releasing action of the releasing coupling device and the engaging action of the engaging coupling device, wherein the releasing coupling device is one of the coupling devices CB which is placed in the engaged state before initiation of the shifting action and which is placed into the released state during the shifting action, and wherein the engaging coupling device is one of the coupling devices CB which is placed in the released state before initiation of the shifting action and which is to be placed into the engaged state during the shifting action.

The hybrid control portion 84 has a function of an engine control means or portion to control the engine 14, and a function of a motor/generator control means or portion to control the first motor/generator MG1 and the second motor/generator MG2 through the inverter 50. Thus, the hybrid control portion 84 performs hybrid drive controls for controlling the engine 14, first motor/generator MG1 and second motor/generator MG2. The hybrid control portion 84 is configured to calculate a required vehicle drive power Pdem on the basis of the accelerator pedal operation amount θacc and the vehicle running speed V, and according to a predetermined relationship in the form of a drive force map, for instance. In other words, the hybrid control portion 84 calculates the required drive torque Tdem at the present vehicle running speed V. The hybrid control portion 84 generates the engine control command signal Se to control the engine 14, and the motor/generator control command signals Smg to control the first motor/generator MG1 and the second motor/generator MG2, for establishing the required vehicle drive power Pdem. For example, the engine control command signals Se represents a command value of an engine power Pe which is a power of the engine 14 outputting the torque Te at its present operating speed ωe. For example, the motor/generator control command signals Smg represent a command value of an electric power amount Wg to be generated by the first motor/generator MG1 to generate the reaction torque acting against the engine torque Te, namely, the MG1 torque Tg at the present MG1 speed ωg, and an electric power amount Wm to be consumed by the second motor/generator MG2 to generate the MG2 torque Tm at the present MG2 rotating speed ωm.

When the transmission device 40 as a whole is operated as the continuously variable transmission while the continuously variable transmission portion 18 is operated as the continuously variable transmission, for instance, the hybrid control portion 84 controls the engine 14 and the electric power amount Wg to be generated by the first motor/generator MG1, so as to establish the engine rotating speed ωe and the engine torque Te for obtaining the engine power Pe to establish the required vehicle drive power Pdem, while taking account of a highest fuel economy point of the engine 14, so that the speed ratio γ0 of the continuously variable transmission portion 18 is controlled so as to be continuously varied. As a result, the speed ratio γt of the transmission device 40 is controlled while the continuously variable transmission portion 18 is operated as the continuously variable transmission.

When the transmission device 40 as a whole is operated as the step-variable transmission while the continuously variable transmission portion 18 is operated as the step-variable transmission, for instance, the hybrid control portion 84 determines a shifting action of the transmission device 40 according to an overall speed position shifting map, for example, and performs a shifting control of the continuously variable transmission portion 18 to establish a selected one of the plurality of overall speed positions, in cooperation with the transmission shifting control portion 82 to shift the step-variable transmission portion 20 selectively to the AT gear positions. The plurality of overall speed positions can be established by controlling the first motor/generator MG1 to control the engine rotating speed ωe according to the output speed ωo so as to maintain the respective speed ratio values γt. It is noted that the speed ratio γt in each of the overall speed positions does not necessarily have to be constant over all ranges of the output speed ωo, but may be changed in a certain range or ranges of the output speed ωo or may be given a limitation or limitations, for example, depending on upper and lower limits of rotating speeds of respective rotatable elements.

Figure 6:
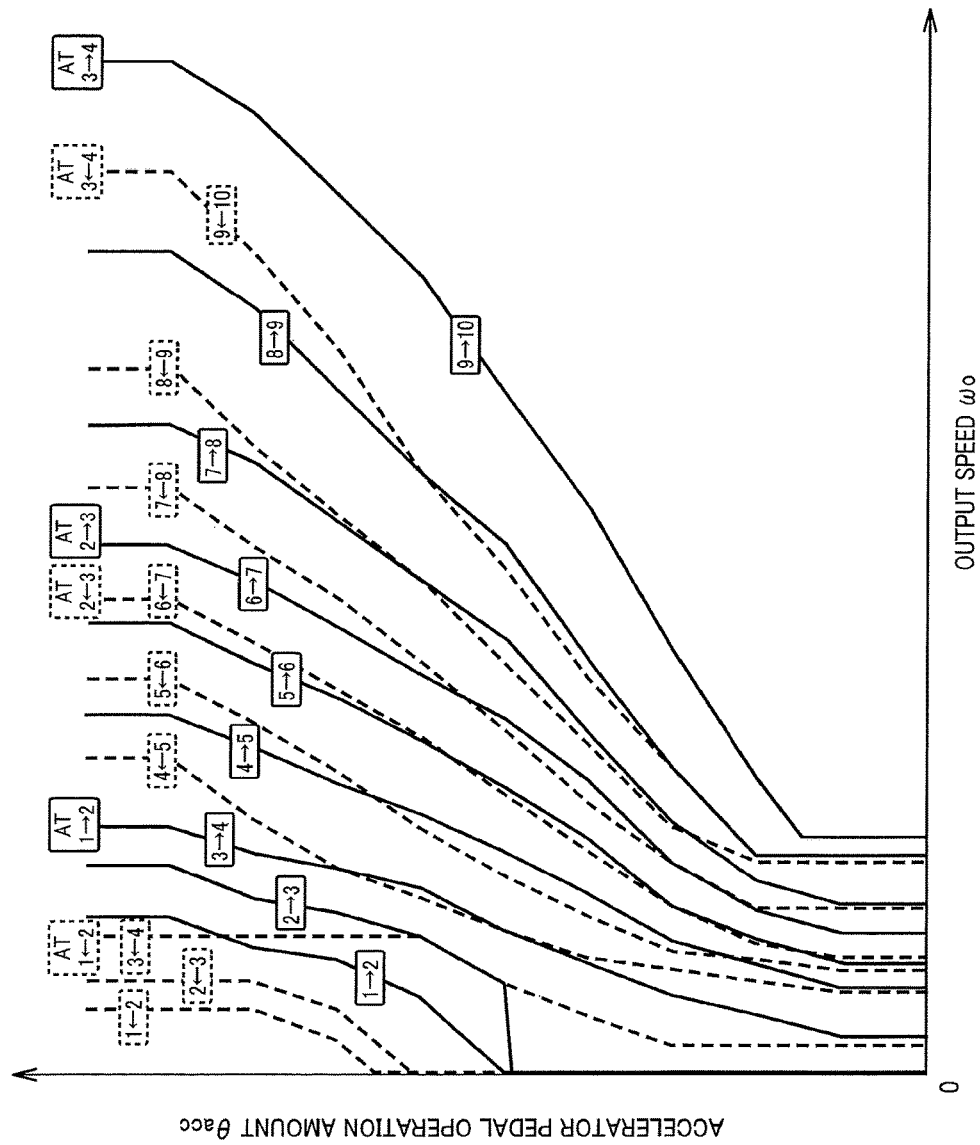
FIG. 6 is a view illustrating an example of an overall speed position shifting map used to shift up and down the transmission device from each of the overall speed positions to the adjacent position or positions.

Like the AT gear position shifting map, the above-indicated overall speed position shifting map is a relationship between the output speed ωo and the accelerator pedal operation amount θacc as parameters. FIG. 6 is the view illustrating an example of the overall speed position shifting map. In FIG. 6, solid lines indicate shift-up boundary lines while broken lines indicate shift-down boundary lines. The transmission device 40 consisting of the continuously variable transmission portion 18 and the step-variable transmission portion 20 which are disposed in series with each other is shifted from one of the overall speed positions to another according to the overall speed position shifting map, as if the transmission device 40 was shifted like a step-variable transmission as a whole. This overall step-variable shifting control to control the shifting actions of the transmission device 40 as the step-variable transmission as a whole may be implemented preferentially to the continuously variable shifting control of the transmission device 40 as the continuously variable transmission as a whole, only when a sporty drive mode or any other high-drivability drive mode is selected by the vehicle operator, or only when the required drive torque Tdem is comparatively large, but may be principally implemented except where the overall step-variable shifting control is restricted or inhibited.

The overall step-variable shifting control by the hybrid control portion 84 and the shifting control of the step-variable transmission portion 20 by the transmission shifting control portion 82 are implemented in cooperation with each other. In this embodiment, the first through tenth overall speed positions are established for the first through fourth speed AT gear positions. When the transmission device 40 is shifted between the fourth overall speed position and the third overall speed position, for example, the step-variable transmission portion 20 is shifted between the second speed AT gear position and the first speed AT gear position. When the transmission device 40 is shifted between the seventh overall speed position and the sixth overall speed position, the step-variable transmission portion 20 is shifted between the third speed AT gear position and the second speed AT gear position. When the transmission device 40 is shifted between the tenth overall speed position and the ninth overall speed position, the step-variable transmission portion 20 is shifted between the fourth speed AT gear position and the third speed AT gear position. Therefore, the AT gear position shifting map is formulated so that the AT gear position shifting operation is performed in synchronization with the overall speed position shifting operation. Described more specifically by reference to FIG. 6, shift-up boundary lines for respectively shifting the transmission device 40 from the third overall speed position to the fourth overall speed position, from the sixth overall speed position to the seventh overall speed position, and from the ninth overall speed position to the tenth overall speed position coincide with shift-up boundary lines for respectively shifting the step-variable transmission portion 20 from the first speed AT gear position to the second speed AT gear position (indicated as "AT1→2" in FIG. 6), from the second speed AT gear position to the third speed AT gear position, and from the third speed AT gear position to the fourth speed AT gear position. Similarly, shift-down boundary lines for respectively shifting the transmission device 40 from the fourth overall speed position to the third overall speed position, from the seventh overall speed position to the sixth overall speed position, and from the tenth overall speed position to the ninth overall speed position coincide with shift-down boundary lines for respectively shifting the step-variable transmission portion 20 from the second speed AT gear position to the first speed AT gear position (indicated as "AT1←2" in FIG. 6), from the third speed AT gear position to the second speed AT gear position, and from the fourth speed AT gear position to the third speed AT gear position. Alternatively, a command to shift the step-variable transmission portion 20 may be applied to the transmission shifting control portion 82 in response to a determination according to the overall speed position shifting map of FIG. 6 that the transmission device 40 should be shifted from one overall speed position to another. Thus, a shift-up action of the transmission device 40 as a whole takes place upon a shift-up action of the step-variable transmission portion 20, and a shift-down action of the transmission device 40 as a whole takes place upon a shift-down action of the step-variable transmission portion 20. The transmission shifting control portion 82 commands the step-variable transmission portion 20 to perform a shifting action from one AT gear position to another, for shifting the transmission device 40 from one overall speed position to another. Since the AT gear position shifting operation is performed in synchronization with the overall speed position shifting operation, the shifting action of the step-variable transmission portion 20 is performed with a change of the engine rotating speed $\omega e$, so that the vehicle operator is less likely to uncomfortably recognize a shifting shock of the step-variable transmission portion 20.

The hybrid control portion 84 selectively establishes the motor drive mode or the hybrid drive mode, depending upon running state of the vehicle 10. For example, the hybrid control portion 84 selects the motor drive mode when the required vehicle drive power Pdem is lower than a predetermined threshold value, that is, within a predetermined motor drive mode range, and selects the hybrid drive mode when the required vehicle drive power Pdem is equal to or higher than the threshold value, that is, within a predetermined hybrid drive mode range. Further, even when the required vehicle drive power Pdem is within the motor drive mode range, the hybrid control portion 84 selects the hybrid drive mode if the electric power amount SOC stored in the battery 52 is smaller than a predetermined threshold value.

Then, the overall step-variable shifting control of the transmission device 40 involving a shifting action of the step-variable transmission portion 20 will be described in detail. The hybrid control portion 84 controls the MG1 torque Tg and the MG2 torque Tm during the shifting action of the step-variable transmission portion 20 under the control of the transmission shifting control portion 82 (more specifically, in the process of engaging and releasing actions of the relevant two coupling devices CB in an inertia phase of the shifting action), on the basis of the engine torque Te and the transmitted torque Tcb of an initiative coupling device which is one of the above-described releasing coupling device and engaging coupling devices and which causes the shifting action to progress, such that an MG2 rotational acceleration value $d\omega m/dt$ representing a change rate (i.e., derivative) of the rotating speed $\omega m$ of the second motor/generator MG2 and an engine rotational acceleration value $d\omega e/dt$ representing the a change rate (i.e., derivative) of the rotating speed $\omega e$ of the engine 14 coincide with respective target trajectories Lm, Le. The target trajectories Lm, Le are trajectories (loci) in the process of the shifting action, along which a target value $\alpha m$ of the MG2 rotational acceleration value $d\omega m/dt$ and a target value $\alpha e$ of the engine rotational acceleration value $d\omega e/dt$ are to be changed, respectively, during the shifting action (particularly, during the inertial phase) of the step-variable transmission portion 20. It is noted that the target trajectories Lm, Le may be referred to as "target behaviors" that are to be represented by the MG2 rotational acceleration value $d\omega m/dt$ and the engine rotational acceleration value $d\omega e/dt$ during the shifting action (particularly, during the inertial phase) of the step-variable transmission portion 20.

The shifting control of the step-variable transmission portion 20 is performed in various shifting modes such as a power-on shift-up mode, a power-off shift-up mode, a power-on shift-down mode and a power-off shift-down mode. For instance, the shifting controls in the power-on shifting modes are implemented when the accelerator pedal operation amount $\theta acc$ is increased or when the vehicle running speed V is raised while the accelerator pedal is kept in an operated position, and the shifting controls in the power-off shifting modes are implemented when the accelerator pedal operation amount $\theta acc$ is reduced or when the vehicle running speed V is lowered while the accelerator pedal is kept in its non-operated or fully released position. If none of the two coupling devices to be respectively brought into the released and engaged states is given the transmitted torque Tcb, the AT input speed $\omega i$ is naturally raised to a predetermined optimum value in the power-on shifting modes, and is naturally lowered to a predetermined optimum value in the power-off shifting modes. Accordingly, the shifting action is preferably initiated by increasing the transmitted torque Tcb of the coupling device CB which is to be brought into the engaged state for the shifting action, in the power-on shift-up and power-off shift-down modes in which the AT input speed $\omega i$ is not naturally changed to a predetermined synchronizing speed $\omega isyca$ (=$\omega o$*speed ratio $\gamma ata$ to be established after completion of the shifting action) if none of the two coupling devices to be respectively brought into the released and engaged states is given the transmitted torque Tcb. On the other hand, the shifting action is preferably initiated by reducing the transmitted torque Tcb of the coupling device CB which has been placed in the engaged state before the shifting action and which is to be brought into the released state for the shifting action, in the power-off shift-up and power-on shift-down modes in which the AT input speed $\omega i$ is naturally changed to the predetermined synchronizing speed $\omega isyca$ even if none of the two coupling devices to be respectively brought into the released and engaged states is given the transmitted torque Tcb. Thus, the coupling device CB to be brought into the engaged state in the power-on shift-up and power-off shift-down modes is the initiative coupling device the transmitted torque Tcb of which is controlled to progressively implement the shifting action, while the coupling device CB to be brought into the released state in the power-off shift-up and power-on shift-down modes is the initiative coupling device the transmitted torque Tcb of which is controlled to progressively implement the shifting action.

Described more specifically, the hybrid control portion 84 (torque control portion 86) is configured to calculate the MG1 torque Tg and the MG2 torque Tm according to the following mathematical equation (1), and on the basis of the target values $\alpha m$, $\alpha e$ of the MG2 rotational acceleration value $d\omega m/dt$ and the engine rotational acceleration value $d\omega e/dt$, the engine torque Te, and an AT-transmitted torque Tat. The hybrid control portion 84 is configured to apply the motor/generator control command signals Smg to the inverter 50, so as to obtain the calculated MG1 torque Tg and MG2 torque Tm. For example, the mathematical equation (1) is derived from kinetic equations and a relationship equation. Each of the kinetic equations is established for a corresponding one of the "g", "e" and "m" axes of the continuously variable transmission portion 18 (indicated in FIG. 3), and is represented by an inertia value, a rotational acceleration value and a torque value on the corresponding axis. The relationship equation is formulated in view of the continuously variable transmission portion 18 which has two degrees of freedom, (namely, in view of a fact that if the rotating speeds taken along two of the above-indicated three axes are determined, the rotating speed taken along the other axis is determined). Accordingly, values a11, . . . , b11, . . . , c22 in 2*2 matrices in the mathematical equation (1) represent combinations of parameters such as the inertia values of the rotary members of the continuously variable transmission portion 18, and the gear ratio $\rho 0$ of the differential mechanism 32.

Mathematical Equation (1)

$$\begin{bmatrix} a_{11} & a_{12} \\ a_{21} & a_{22} \end{bmatrix} \begin{bmatrix} \dot{\omega}_m \\ \dot{\omega}_e \end{bmatrix} = \begin{bmatrix} b_{11} & b_{12} \\ b_{21} & b_{22} \end{bmatrix} \begin{bmatrix} T_m \\ T_g \end{bmatrix} + \begin{bmatrix} c_{11} & c_{12} \\ c_{21} & c_{22} \end{bmatrix} \begin{bmatrix} T_e \\ T_{at} \end{bmatrix} \quad (1)$$

The MG2 rotational acceleration value dωm/dt and the engine rotational acceleration value dωe/dt in the above equation (1) are the target values αm, αe (i.e., target trajectories or behaviors Lm, Le) that are predetermined depending upon (i) the presently established one of the shifting modes of the step-variable transmission portion 20, (ii) the specific shifting action of the step-variable transmission portion 20 to be performed between the AT gear positions, and (iii) the vehicle running speed V, namely, depending upon (i) which one of the shifting modes (such as the above-described power-on shift-up mode, power-off shift-up mode, power-on shift-down mode and power-off shift-down mode) is to be performed in the step-variable transmission portion 20, (ii) between which AT speed positions the shifting action is to be performed in the step-variable transmission portion 20, and (iii) the vehicle running speed V, such that the shifting performance requirements are suitably satisfied. It is noted that the target values αm, αe may be compensated as needed, during the shifting action. The engine torque Te in the mathematical equation (1) is a required engine torque Tedem at the engine rotating speed ωe at which the engine power Pe for obtaining the required vehicle drive power Pdem (i.e. required engine power Pedem) is obtained.

The AT-transmitted torque Tat in the mathematical equation (1) is a sum of the torque values of the intermediate power transmitting member 30 (the rotating speed of which is taken along the "m" axis) which are obtained by conversion from the transmitted torques Tcb transmitted through the respective two coupling devices CB during the relevant shifting action of the step-variable transmission portion 20, namely, the torque value of the intermediate power transmitting member 30 obtained by conversion from the torque transmitted through the step-variable transmission portion 20. The mathematical equation (1) is an equation for a theoretical model of the shifting action of the step-variable transmission portion 20. In this respect, the transmitted torque Tcb of the initiative coupling device which is controlled to progressively implement the shifting action is used as the AT-transmitted torque Tat in the mathematical equation (1). The transmitted torque Tcb used as the AT-transmitted torque Tat in the mathematical equation (1) is a feed-forward value. To this end, the electronic control device 80 sets the transmitted torque Tcb of the initiative coupling device, such that the transmitted torque Tcb is set to correspond to the AT input torque Ti based on the required vehicle drive power Pdem establishing the required vehicle drive power Pdem, according to an appropriate one of a plurality of predetermined relationships between the transmitted torque Tcb and the input torque Ti, which are formulated to ensure a good balance between the shifting shock and the required shifting time of the step-variable transmission portion 20 and which correspond to respective different combinations of the presently established shifting mode and the specific shifting action of the step-variable transmission portion 20 to be performed between the AT gear positions.

As described above, upon the shifting action of the step-variable transmission portion 20, the MG1 torque Tg and the MG2 torque Tm are controlled such that the MG2 rotational acceleration value dωm/dt and the engine rotational acceleration value dωe/dt are changed along the respective target trajectories Lm, Le, so as to constantly coincide with the respective target values αm, αe. However, depending on situation relating to limitations of the maximum charging amount Win and maximum discharging amount Wout of the battery 52, it could become difficult to control the MG1 torque Tg and the MG2 torque Tm, for causing the MG2 rotational acceleration value dωm/dt and the engine rotational acceleration value dωe/dt to coincide with the respective target values αm, αe. In such a case, the shifting time could be increased or the shifting shock could be increased, for example, so that the shifting performance requirements could not be satisfied.

In view of such possible problems, the electronic control device 80 functionally includes portions configured, upon the shifting action of the step-variable transmission, portion 20, to set the target trajectories Lm, Le of the MG2 rotational acceleration value dωm/dt and the engine rotational acceleration value dωe/dt, on the basis of the limitations of the maximum charging amount Win and maximum discharging amount Wout of the battery 52, such that the shifting performance requirements are satisfied. Specifically, the electronic control device 80 functionally includes a target-trajectory setting means in the form of a target-trajectory setting portion 86, a vehicle-state determining means in the form of a vehicle-state determining portion 87 and a battery-limitation determining means in the form of a battery-limitation determining portion 88. The target-trajectory setting portion 86 is configured, upon the shifting action of the step-variable transmission portion 20, to set the target trajectories Lm, Le of the MG2 rotational acceleration value dωm/dt and the engine rotational acceleration value dωe/dt, on the basis of the maximum charging amount Win and maximum discharging amount Wout of the battery 52.

The vehicle-state determining portion 87 is configured to determine whether the currently performed shifting action is a shift-up action or not, for example, based on the hydraulic control command signals Sat. Further, the vehicle-state determining portion 87 is configured, during running of the vehicle 10, determine the vehicle 10 is in a power-off state (driven state) or not, for example, depending on whether a required drive force (drive force required by the vehicle operator) calculated from values such as the operation amount θacc of an accelerator pedal and the vehicle running speed V is lower than a predetermined value. This predetermined value is a threshold value, based on which it is determined whether the vehicle is in a power-on state (driving state) or the power-off state (driven state). This predetermined value is set to be larger than zero.

The battery-limitation determining portion 88 is configured to calculate the maximum charging and discharging amounts Win, Wout of the battery 52, and to determine whether the maximum charging and discharging amounts Win, Wout are not larger than respective predetermined threshold values (lower limit values), i.e., a charging threshold value Winf and a discharging threshold value Woutf, respectively. The charging threshold value Winf and discharging threshold value Woutf are preobtained by experimentation or predetermined by an appropriate design theory, and set to values that enable the first motor/generator MG1 and second motor/generator MG2 to output the MG1 torque Tg and MG2 torque Tm, respectively, which are required for the ordinary shifting action of step-variable transmission portion 20.

When the battery-limitation determining portion 88 determines that the maximum charging amount Win is larger than the charging threshold value Winf and that the maximum discharging amount Wout is larger than the discharging threshold value Woutf, it is determined that the first motor/generator MG1 and second motor/generator MG2 can output the respective MG1 torque Tg and MG2 torque Tm that are required for the ordinary shifting action of step-variable transmission portion 20. In this instance, the target-trajectory setting portion 86 sets the target trajectories Lm, Le of the respective MG2 rotational acceleration value dωm/dt and engine rotational acceleration value dωe/dt, which have been determined for a normal case where the first motor/generator MG1 and second motor/generator MG2 can output the respective MG1 torque Tg and MG2 torque Tm that are required for the shifting action of step-variable transmission portion 20. The target trajectories Lm, Le determined for the normal case (hereinafter referred to as "standard target trajectories Lms, Les) are optimum trajectories (i.e., successions of optimum values) that optimally satisfy the shifting performance requirements, namely, satisfactorily exhibiting both of the shifting shock reduction and shifting responsiveness.

When the battery-limitation determining portion 88 determines that the maximum charging amount Win is not larger than the charging threshold value Winf and/or that the maximum discharging amount Wout is not larger than the discharging threshold value Woutf, the target-trajectory setting portion 86 sets the target trajectories Lm, Le (target values αm, αe) of the MG2 rotational acceleration value dωm/dt and engine rotational acceleration value dωe/dt, depending on the situation relating to the limitations of the maximum charging amount Win and maximum discharging amount Wout of the battery 52.

Figure 7:
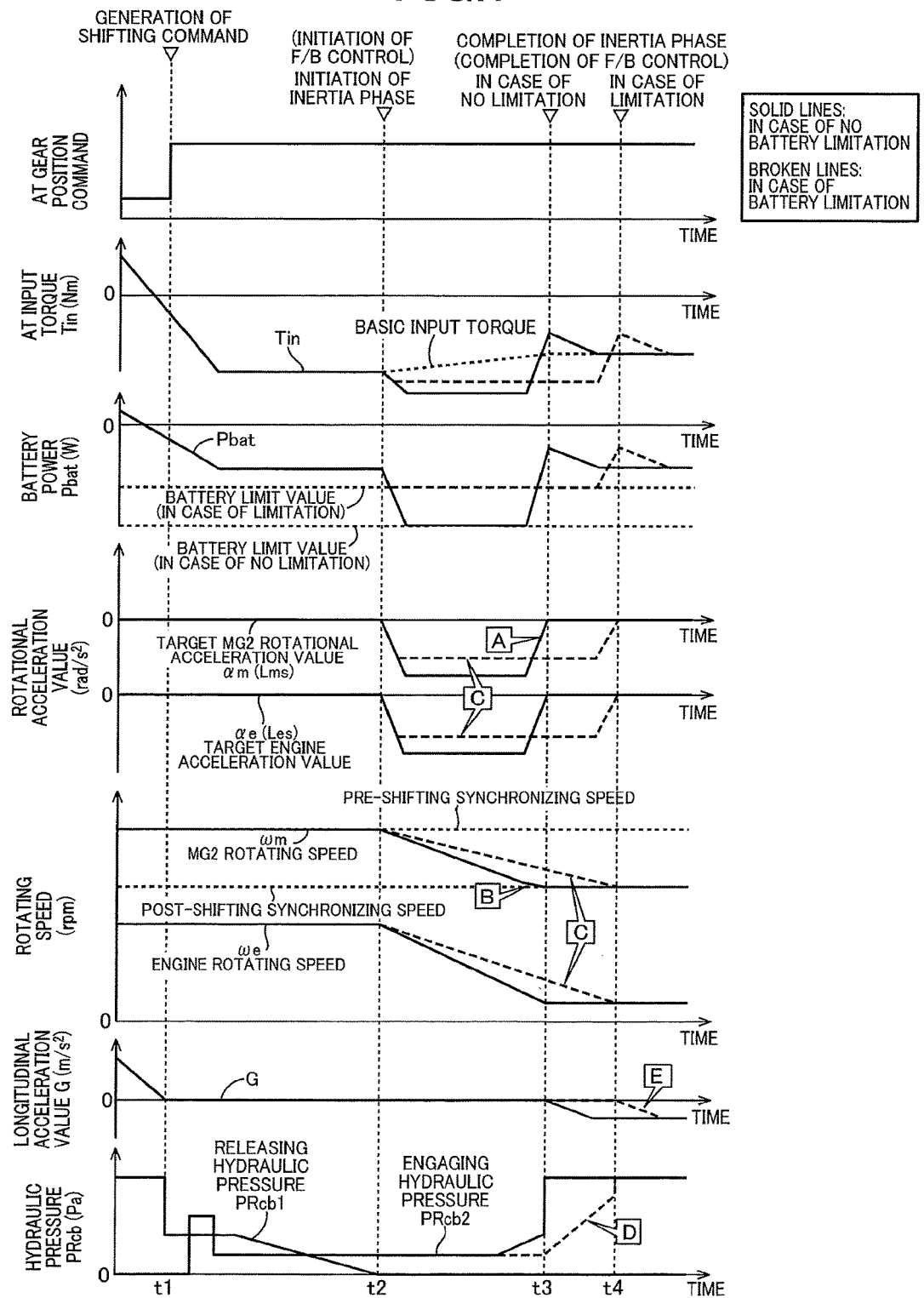
FIG. 7 is a time chart illustrating an example of a power-off shift-up action of the step-variable transmission portion performed, in a case when a maximum charging amount of a battery is limited, particularly, with a normal control being executed without changing target trajectories in spite of the limitation of the maximum charging amount.

There will be first described a control executed for a power-off shift-up action that is performed, in presence of battery limitation, specifically, in a case when the maximum charging amount Win of the battery 52 is limited to the charging threshold value Winf or less. FIG. 7 is a time chart illustrating an example of the power-off shift-up action of the step-variable transmission portion 20 performed, in the case when the maximum charging amount Win of the battery 52 is limited to the charging threshold value Winf or less, particularly, with a shifting control (normal control) being executed without changing the target trajectories Lm, Le in spite of the limitation of the maximum charging amount Win. In FIG. 7, solid lines represent, as a comparative example, a control performed in absence of battery limitation, namely, in a case when the maximum charging amount Win is larger than the charging threshold value Winf so that the battery power Pbat required for the shifting action under the normal control is available. Meanwhile, broken lines represent a control performed in presence of battery limitation, namely, in a case when the maximum charging amount Win is not larger than the charging threshold value Winf so that the battery power Pbat required for the shifting action under the normal control is not available.

In FIG. 7, a point of time t1 represents a point of time at which a shifting command for implementing the power-off shift-up action is generated, a point of time t2 represents a point of time at which the inertia phase is initiated, a point of time t3 represents a point of time at which the inertia phase is completed in a case when the battery power Pbat is not limited, and a point of time t4 represents a point of time at which the inertia phase is completed in a case when the battery power Pbat is limited. In the power-off shift-up action, at the point of time t2 at which the inertia phase is initiated, a releasing hydraulic pressure PRcb1, i.e., a hydraulic pressure applied to the releasing coupling device, is reduced to zero, while an engaging hydraulic pressure PRcb2, i.e., a hydraulic pressure applied to the engaging coupling device is held a level slightly lower than a value which causes initiation of an engaging contact of the input and output elements of the engaging coupling device with each other to provide the engaging coupling device with the engaging torque Tcb, so that the step-variable transmission portion 20 is in a so-called "clutch-free state" without the transmitted torque that is to be transmitted through the step-variable transmission portion 20.

During the power-off shift-up action (particularly, during the inertia phase) of the step-variable transmission portion 20, the MG1 torque Tg and MG2 torque Tm are controlled such that the engine rotational acceleration value dωe/dt is reduced to follow a target engine rotational acceleration value αe as its target value, and the MG2 rotational acceleration value dωm/dt is reduced to follow a target MG2 rotational acceleration value αm as its target value. That is, the standard target trajectory Lms of the MG2 rotational acceleration value dωm/dt of the second motor/generator MG2 and the standard target trajectory Les of the engine rotational acceleration value dωe/dt of the engine 12 are set, as represented by solid lines in FIG. 7, and the MG1 torque Tm and the MG2 torque Tg, which cause the MG2 rotational acceleration value dωm/dt and the engine rotational acceleration value dωe/dt to coincide with the respective target values αm, αe, are calculated in accordance with the above equation (1). The calculated MG1 torque Tm and MG2 torque Tg are then outputted from the first motor/generator MG1 and second motor/generator MG2, so that the engine rotating speed ωe and the MG2 rotating speed ωm are reduced at desired rates in the inertia phase between the point of time t2 and the point of time t3. Shortly before the point of time t3 at which the inertia phase is completed, the target MG2 rotational acceleration value αm is reduced, namely, changed toward a positive side (see "A" in FIG. 7), whereby the rate of the change of the MG2 rotating speed ωm is reduced while the MG2 rotating speed ωm is synchronized with a post-shifting synchronizing speed, for thereby reducing a synchronizing shock (see "B" in FIG. 7).

In the case represented by broken lines in which the maximum charging amount Win of the battery 52 is limited, it is not possible to cause the motor/generator MG1 and the motor/generator MG2 to output the MG1 torque Tm and the MG2 torque Tm that are required to cause the MG2 rotational acceleration value dωm/dt and the engine rotational acceleration value dωe/dt to coincide with the respective target values αm, αe, so that the changes of the engine rotating speed ωe and the MG2 rotating speed ωm are delayed as compared with the case without the battery limitation, and accordingly the inertia phase is completed at the point of time t4 that is later than the point of time t3. Thus, in the case with the battery limitation, as a result of the delay, a backup control is executed to increase the engaging hydraulic pressure PRcb2 (see "D" in FIG. 7) for forcibly causing the shifting action to progress, whereby the synchronizing shock is generated in this instance. Further, the vehicle is decelerated at a delayed point of time (see "E" in FIG. 7).

On the other hand, in the present embodiment of the invention, when the power-off shift-up action of the step-variable transmission portion 20 is performed in the case with the battery limitation in which the maximum charging amount Win of the battery 52 is limited, the target-trajectory setting portion 86 shifts the target trajectory Le (target value αe) of the engine rotational acceleration value dωe/dt toward a positive side (increases the target value αe toward a positive side) as compared with the standard target trajectory Les that is set in the case without the battery limitation, so that the MG2 rotating speed ωm is changed at the same rate (or substantially the same rate) as in the case without the battery limitation. That is, when the power-off shift-up action is performed in the case with the battery limitation in which the maximum charging amount Win is limited, the target-trajectory setting portion 86 sets the target trajectory Lm (target value αm) of the MG2 rotational acceleration value dωm/dt, to a value equal (or substantially equal) to the standard target trajectory Lms that is set in the case without the battery limitation, while changing the target trajectory Le (target value αe) of the engine rotational acceleration value dωe/dt toward the positive side (toward zero) as compared with the standard target trajectory Les that is set in the case without the battery limitation.

With the target trajectories Lm, Le (target values αm, αe) being set as described above, in the case with the battery limitation in which the battery power Pbat (i.e., maximum charging amount) is limited whereby generation of the MG2 torque Tm (regenerative torque) is limited, the engine 14 is rotated at a speed higher than in the case without the battery limitation, whereby a power that cannot be absorbed by the MG2 torque Tm (regenerative torque) is consumed as an inertia power of the engine 14. Therefore, even in the case in which the battery power Pbat is limited, the MG2 rotating speed ωm can be controlled to be the same as in the case without the battery limitation. Further, although the engine rotating speed ωe reaches a target speed that is desired upon completion of the shifting action, at a later point of time than in the case without the battery limitation, the MG2 rotating speed ωm (i.e., AT input speed ωi) is changed at the same timing as in the case without the battery limitation, so that the backup control is not executed whereby the synchronizing shock is reduced. Further, it is possible to reduce delay of generation of an engine brake, which could be caused by elongation of the shifting time. Thus, when the power-off shift-up action is performed in the case with the battery limitation (with limitation of the maximum charging amount), a higher priority is given to the change of the MG2 rotating speed ωm (AT input speed ωi) than to the change of the engine rotating speed ωe, whereby the synchronizing shock is reduced and the delay of deceleration of the vehicle is also reduced, so that it is possible to satisfy the shifting performance requirements.

During the power-off shift-up action performed in the case with the battery limitation (with limitation of the maximum charging amount), the hybrid control portion 84 executes a fuel cut suspending supply of fuel to the engine 14 as long as there is not an engine drive request for warming-up or maintaining a catalyst temperature. With execution of the fuel cut, in the case with limitation of the maximum charging amount Win, the inertia power can be efficiently consumed by an engine friction that is caused by the fuel cut, whereby the progress of the shifting action can be facilitated.

During the power-off shift-up action performed in the case with the battery limitation (with limitation of the maximum charging amount), if the engine 14 is required to be driven for warming-up or maintaining the catalyst temperature, the execution of the fuel cut is difficult. In this case, the transmission shifting control portion 82 makes the engaging hydraulic pressure PRcb2 of the engaging coupling device higher than in the case without the battery limitation, thereby increasing the torque capacity of the step-variable transmission portion 20 and causing a drag in the step-variable transmission portion 20, whereby the inertia energy is consumed by the drag caused in the step-variable transmission portion 20 so that the progress of the shifting action can be facilitated.

During the power-off shift-up action performed in the case with limitation of the maximum discharging amount Wout of the battery 52 and with execution of the fuel cut suspending the fuel supply to the engine 14, the target-trajectory setting portion 86 shifts the target trajectory Lm (target value αm) of the MG2 rotational acceleration value dωm/dt toward a negative side as compared with the standard target trajectory Lem that is set in the case without the battery limitation, so that the engine rotating speed ωe is changed at the same rate (or substantially the same rate) as in the case without the battery limitation. That is, in the case with the battery limitation in which the maximum discharging amount Wout is limited, the target-trajectory setting portion 86 sets the target trajectory Le (target value αe) of the engine rotational acceleration value dωe/dt, to a value equal (or substantially equal) to the standard target trajectory Les that is set in the case without the battery limitation, while changing the target trajectory Lm (target value αm) of the MG2 rotational acceleration value dωm/dt toward the negative side (increasing toward the negative side) as compared with the standard target trajectory Lms that is set in the case without the battery limitation.

If the shifting time is extended, the battery power Pbat would be insufficient to compensate the inertia energy excessively consumed by an engine friction, and the MG2 torque Tm would be insufficient to increase the engine rotating speed ωe, thereby causing a risk of excessive reduction of the engine rotating speed ωe. However, with the target trajectories Lm, Le (target values αm, αe) being set as described above, the excessive reduction of the engine rotating speed ωe is restrained by expediting the progress of the shifting action by a degree that does not worsen the shock level.

Figure 8:
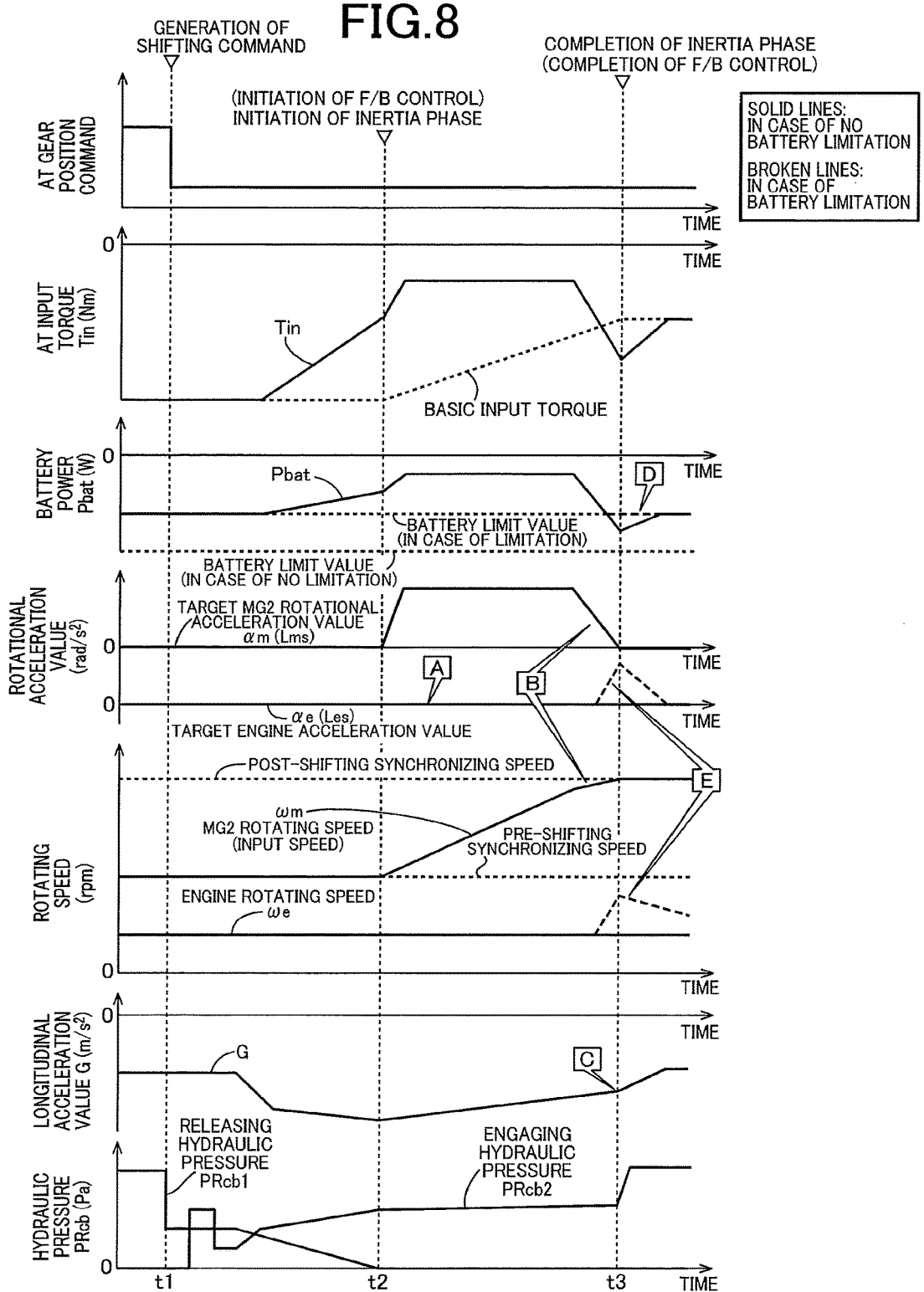
FIG. 8 is a time chart illustrating an example of a power-off shift-down action of the step-variable transmission portion performed, in a case when the maximum charging amount of the battery is limited, particularly, with a normal control being executed without changing target trajectories in spite of the limitation of the maximum charging amount.

Next, there will be described a control executed for a power-off shift-down action that is performed in a case when the maximum charging amount Win of the battery 52 is limited to the charging threshold value Winf or less. FIG. 8 is a time chart illustrating an example of the power-off shift-down action of the step-variable transmission portion 20 performed, in the case when the maximum charging amount Win of the battery 52 is limited to the charging threshold value Winf or less, particularly, with a shifting control (normal control) being executed without changing the target trajectories Lm, Le in spite of the limitation of the maximum charging amount Win. In FIG. 8, solid lines represent, as a comparative example, a control performed in the case without the battery limitation. Meanwhile, broken lines represent a control performed in the case with the battery limitation (with limitation of the maximum charging amount Win). In FIG. 8, a point of time t1 represents a point of time at which a shifting command for implementing the power-off shift-down action is generated, a point of time t2 represents a point of time at which the inertia phase is initiated, a point of time t3 represents a point of time at which the inertia phase is completed.

In the case (case without the battery limitation) represented by solid lines in which the maximum charging amount Win of the battery 52 is not limited, the target trajectory Les (target engine rotational acceleration value αe) of the engine rotational acceleration value dωe/dt is set to zero (see "A" in FIG. 8). Meanwhile, the target trajectory Lms (target G2 rotational acceleration value αm) is set such that the MG2 rotational acceleration value dωm/dt becomes synchronized with a post-shifting synchronizing speed after a certain length of time from the point of time t2 in which the inertia phase is initiated. Then, shortly before the point of time t3 at which the inertia phase is completed, the target MG2 rotational acceleration value αm is reduced whereby the rate of change of the MG2 rotating speed ωm is reduced (see "B" in FIG. 8) for reducing ting the synchronizing shock (see "C" in FIG. 8). That is, at a stage close to the point of time t3, the MG2 torque Tm is reduced whereby the rate of change of the MG2 rotating speed ωm is reduced.

In the case where the maximum charging amount Win of the battery 52 is limited, since the battery power Pbat (maximum charging amount Win) required for reducing the MG2 torque Tm shortly before the point of time t3 is limited (see "D" in FIG. 8), the inertia power cannot be absorbed by the MG2 torque Tm (regenerative torque) so that the engine rotating speed ωe could be increased too much (see "E" in FIG. 8) due to a power balance. That is, the engine rotating speed ωe is increased by an amount by which the inertia power cannot be absorbed by the MG2 torque Tm (regenerative torque).

On the other hand, in the present embodiment of the invention, when the power-off shift-down action of the step-variable transmission portion 20 is performed in the case with the battery limitation in which the maximum charging amount Win of the battery 52 is limited, the target-trajectory setting portion 86 shifts the target trajectory Lm (target value αm) of the MG2 rotational acceleration value dωm/dt toward a positive side as compared with the standard target trajectory Lms that is set in the case without the battery limitation, such that, in the vicinity of a synchronizing point of time at which a difference between the MG2 rotating speed ωm (AT input speed ωi) and a post-shifting synchronizing speed becomes not larger than a predetermined value, the engine rotating speed ωe is changed at the same rate (or substantially the same rate) as in the case without the battery limitation. That is, when the power-off shift-down action is performed in the case with the battery limitation in which the maximum charging amount Win is limited, the target-trajectory setting portion 86 sets the target trajectory Le (target value αe) of the engine rotational acceleration value dωe/dt in the vicinity of the above-described synchronizing point, to a value equal (or substantially equal) to the standard target trajectory Les that is set in the case without the battery limitation, while changing the target trajectory Lm (target value αm) of the MG2 rotational acceleration value dωm/dt toward the positive side as compared with the standard target trajectory Lms that is set in the case without the battery limitation. With the target trajectories Lm, Le being set as described above, the MG2 rotating speed ωm in the vicinity of the above-described synchronizing point is made higher than in the case of without the battery limitation, whereby the inertia power is consumed and accordingly the engine rotating speed ωe is restrained from being increased.

Figure 9:
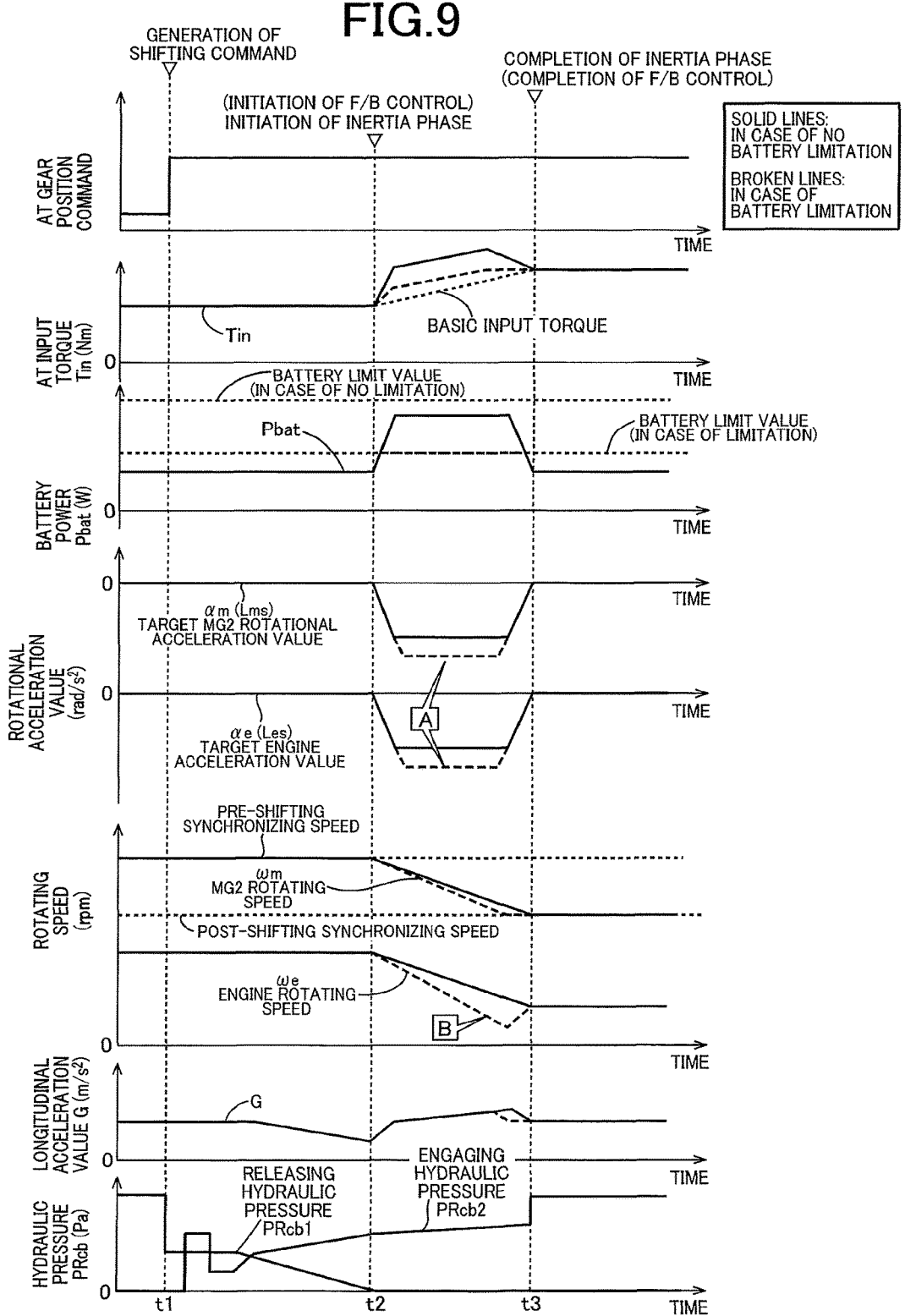
FIG. 9 is a time chart illustrating an example of a power-on shift-up action of the step-variable transmission portion performed, in a case when the maximum discharging amount of the battery is limited, particularly, with a normal control being executed without changing target trajectories in spite of the limitation of the maximum discharging amount.

Next, there will be described a control executed for a power-on shift-up action that is performed in a case when the maximum discharging amount Wout of the battery 52 is limited to the discharging threshold value Woutf or less. FIG. 9 is a time chart illustrating an example of the power-on shift-up action of the step-variable transmission portion 20 performed, in the case when the maximum discharging amount Wout of the battery 52 is limited to the discharging threshold value Woutf or less, particularly, with a shifting control (normal control) being executed without changing the target trajectories Lm, Le in spite of the limitation of the maximum discharging amount Wout. In FIG. 9, solid lines represent, as a comparative example, a control performed in the case without the battery limitation. Meanwhile, broken lines represent a control performed in the case with the battery limitation (with limitation of the maximum discharging amount Wout). In FIG. 9, a point of time t1 represents a point of time at which a shifting command for implementing the power-on shift-up action is generated, a point of time t2 represents a point of time at which the inertia phase is initiated, a point of time t3 represents a point of time at which the inertia phase is completed.

As shown in FIG. 9, in the case without the battery limitation represented by solid lines, the target trajectory Les, Lms (target values αe, αm) are set such that the engine rotating speed ωe and the MG2 rotating speed ωm (AT input speed ωi) are reduced to respective target speeds after a certain length of time from the point of time t2 at which the inertia phase is initiated. In the case in which the maximum discharging amount Wout of the battery 52 is limited, the MG2 rotational acceleration value dωm/dt and the engine rotational acceleration value dωe/dt cannot be controlled to follow the respective target trajectory Les, Lms, so that the MG2 rotational acceleration value dωm/dt and the engine rotational acceleration value dωe/dt are made larger toward a negative side as compared with the target values αm, αe of the case without the battery limitation (see "A" in FIG. 9). Consequently, the engine rotating speed ωe is made lower than in the case without the battery limitation represented by solid lines (see "B" in FIG. 9), thereby causing a risk that the vehicle operator could uncomfortably recognize an engaging shock of the step-variable transmission portion 20 and reducing drivability.

On the other hand, in the present embodiment of the invention, when the power-on shift-up action of the step-variable transmission portion 20 is performed in the case with the battery limitation in which the maximum discharging amount Wout of the battery 52 is limited, the target-trajectory setting portion 86 shifts the target trajectory Lm (target value αm) of the MG2 rotational acceleration value dωm/dt toward a negative side as compared with the standard target trajectory Lms that is set in the case without the battery limitation, such that the engine rotating speed ωe is changed at the same rate (or substantially the same rate) as in the case without the battery limitation. That is, when the power-on shift-up action is performed in the case with the battery limitation in which the maximum discharging amount Wout is limited, the target-trajectory setting portion 86 sets the target trajectory Le (target value αe) of the engine rotational acceleration value dωe/dt to a value equal (or substantially equal) to the standard target trajectory Les that is set in the case without the battery limitation, while changing the target trajectory Lm (target value αm) of the MG2 rotational acceleration value dωm/dt toward the negative side as compared with the standard target trajectory Lms that is set in the case without the battery limitation. With the target trajectories Lm, Le being set as described above, the excessive reduction of the engine rotating speed ωe is restrained by expediting the progress of the shifting action by a degree that does not worsen the shock level.

Figure 10:
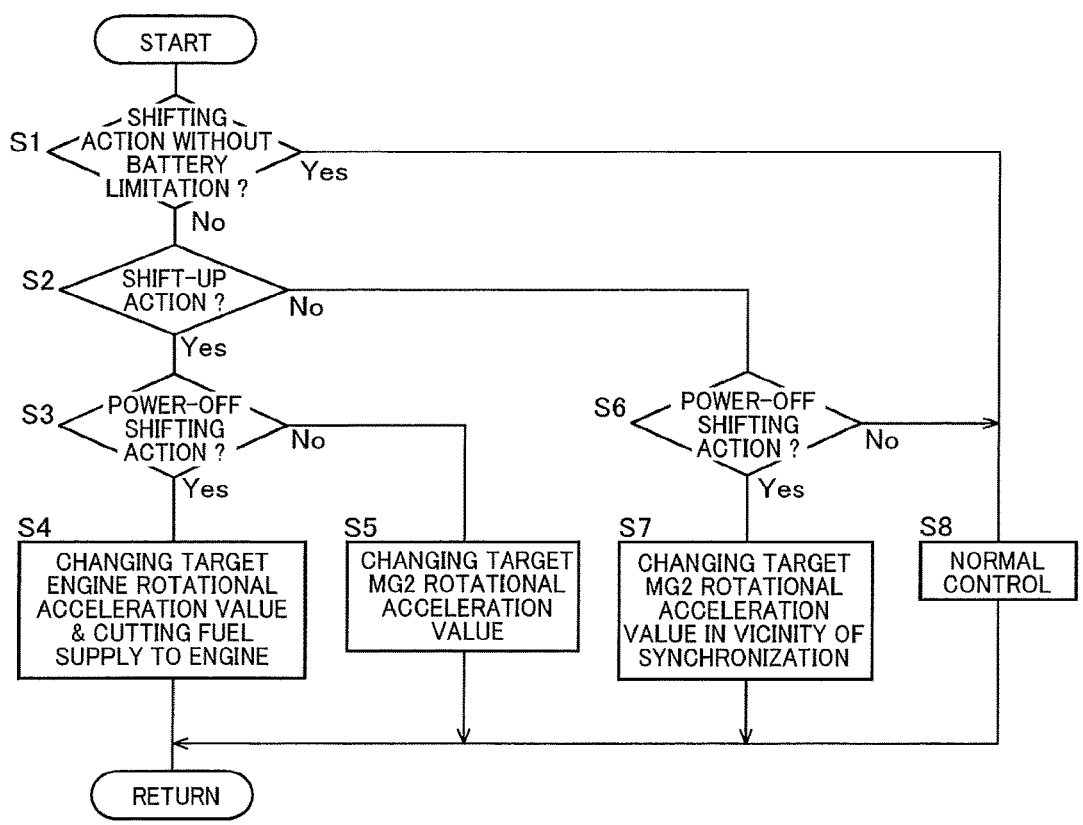
FIG. 10 is a flow chart illustrating an essential part of a main control routine executed by an electronic control device, that is, a control routine to enable a shifting action of the step-variable transmission portion to be appropriately implemented even in a case of limitation of the battery.

The flow chart of FIG. 10 illustrates an essential part of a main control routine executed by the electronic control device 80, that is, a control routine to satisfy the shifting performance requirements when the shifting action of the step-variable transmission portion 20 is implemented even in the case of limitation of the battery 52. This control routine is executed each time it is determined that the shifting action of the step-variable transmission portion 20 is implemented.

The control routine of FIG. 10 is initiated with step S1 corresponding to the function of the battery-limitation determining portion 88, to determine whether the shifting action is implemented without the battery limitation, to determine whether the maximum charging amount Win of the battery 52 is larger than a predetermined charging threshold value (lower limit value) Winf and the maximum discharging amount Wout of the battery 52 is larger than a predetermined discharging threshold value (lower limit value) Woutf. If an affirmative determination (YES) is obtained in step S1, the control flow goes to step S8 corresponding to the functions of the transmission shifting control portion 82, hybrid control portion 84 and target-trajectory setting portion 86, to execute a shifting control based on the standard target trajectories Lms, Les (target values αm, αe) that are to be applied in the case without the battery limitation.

If a negative determination (NO) is obtained in step S1, namely, if it is determined that the maximum charging amount Win of the battery 52 is not larger than the predetermined charging threshold value Winf and/or the maximum discharging amount Wout of the battery 52 is not larger than the predetermined discharging threshold value Woutf, the control flow goes to step S2 corresponding to the function of the vehicle-state determining portion 87, to determine whether the shifting action of the step-variable transmission portion 20 is a shift-up action or not. If an affirmative determination (YES) is obtained in step S2, the control flow goes to step S3 corresponding to the function of the vehicle-state determining portion 87, to determine whether the vehicle is in the power-off state (driven state) or not.

If an affirmative determination (YES) is obtained in step S3, the control flow goes to step S4 corresponding to the functions of the transmission shifting control portion 82, hybrid control portion 84 and target-trajectory setting portion 86, to implement the power-off shift-up action of the step-variable transmission portion 20 for the case with the battery limitation. In step S4, when the maximum charging amount Win of the battery 52 is limited, the engine rotational acceleration value dωe/dt target trajectory Le is shifted toward a positive side, as compared with the standard target trajectory Les that is set in the case without the battery limitation, and the fuel cut suspending the fuel supply to the engine 14 is executed.

Figure 11:
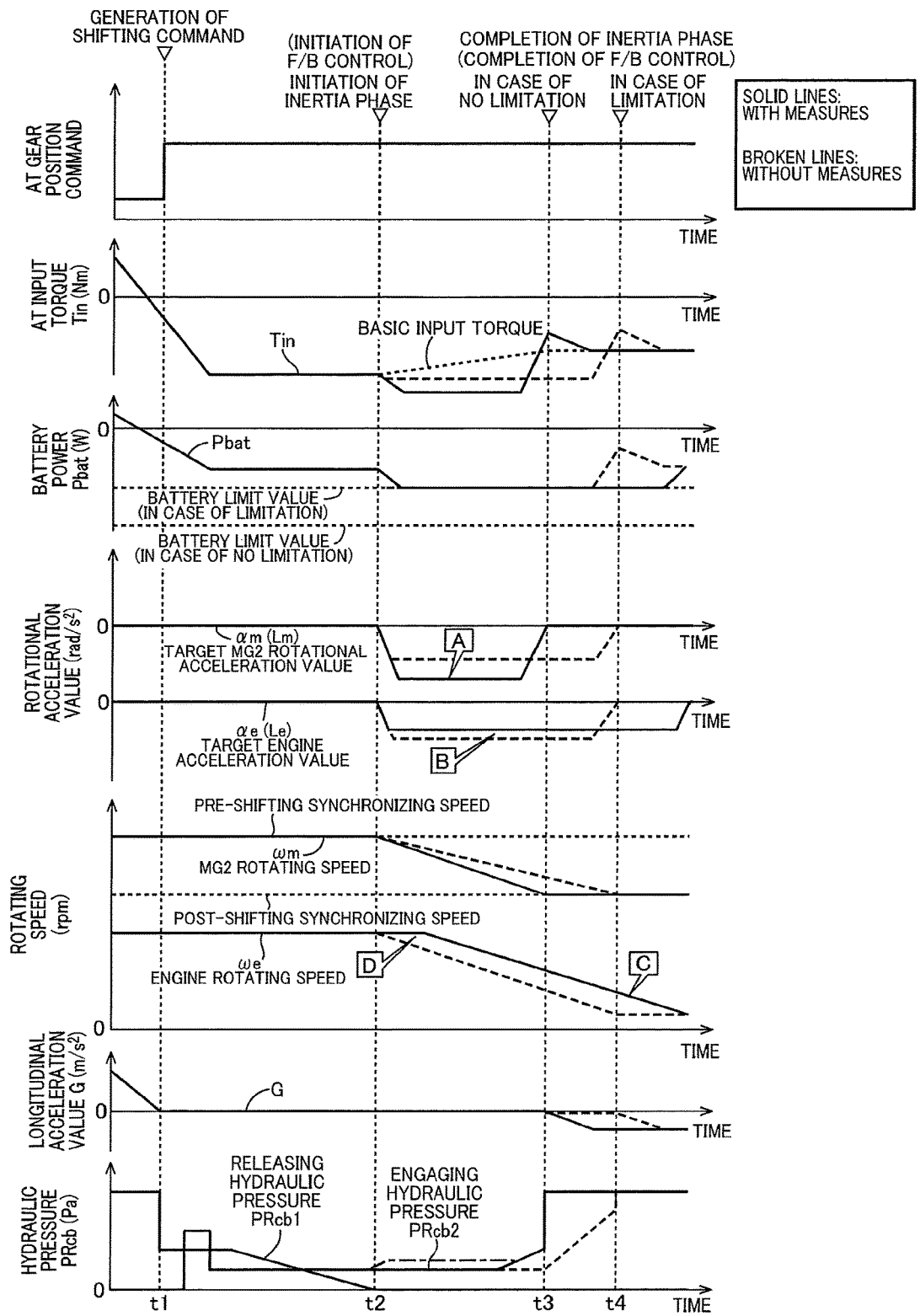
FIG. 11 is a time chart illustrating an example of a control operation executed as shown in the flow chart of FIG. 10, for explaining a control status during the power-off shift-up action of the step-variable transmission portion implemented in a case in which the maximum charging amount of the battery is limited.

FIG. 11 is the time chart illustrating an example of control status when the shifting control is executed as shown in the flow chart of FIG. 10, for explaining the control status (corresponding to step S4 of FIG. 10) during the power-off shift-up action of the step-variable transmission portion 20 implemented in the case in which the maximum charging amount Win of the battery 52 is limited. In the inertia phase that is initiated at the point of time t2, a higher priority is given to the change of the MG2 rotating speed ωm than to the change of the engine rotating speed ωe. Specifically, the target trajectory Lm of the MG2 rotational acceleration value dωm/dt is set to be equal to the standard target trajectory Lms that is set in the case without the battery limitation (see "A" in FIG. 11), so that the target MG2 rotational acceleration value αm is close to that in the case without the battery limitation. Meanwhile, the target trajectory Le of the engine rotational acceleration value dωe/dt is shifted toward a positive side (see "B" in FIG. 11) as compared with the target trajectory Le of the engine rotational acceleration value dωe/dt (represented by broken lines) without measures. Thus, although the reduction of the engine rotating speed ωe is delayed (see "C" in FIG. 11), a power which cannot be regenerated by the MG2 torque Tm (regenerative torque) is consumed by an inertia power of the engine 14, so that the MG2 rotating speed ωm and the target MG2 rotational acceleration value αm can be made close to those in the case without the battery limitation, even in the case in which the maximum charging amount Win of the battery 52 is limited. Therefore, it is possible to avoid delay of the synchronization of the MG2 rotating speed ωm with the post-shifting synchronizing speed and to avoid execution of the backup control due to delay of completion of the shifting action. Accordingly, the shifting shock resulting from execution of the backup control and the delay of deceleration of the vehicle are avoided. It is noted that the target trajectory Le does not have to be set necessarily such that the engine rotating speed ωe starts to be reduced immediately after the initiation of the inertia phase, but may be set such that the engine rotating speed ωe starts to be reduced after being kept constant for a certain length of time after the initiation of the inertia phase (see "D" in FIG. 11). Further, as indicated by one-dot chain line, the engaging hydraulic pressure PRcb2 of the engaging coupling device may be increased to generate the torque capacity in the step-variable transmission portion 20, so that the progress of the shifting action is facilitated by a drag caused in the step-variable transmission portion 20.

Further, at step S4, where the maximum discharging amount Wout of the battery 52 is limited and the fuel cut is executed to suspend the fuel supply to the engine 14, the target trajectories Lm, Le are set such that a higher priority is given to the engine rotating speed ωe of the engine 14 than to the change of the MG2 rotating speed ωm of the second motor/generator MG2. That is, the target trajectory Le (target value αe) of the engine rotational acceleration value dωe/dt is set to a value equal (or substantially equal) to the standard target trajectory Les that is set in the case without the battery limitation, while changing the target trajectory Lm (target value αm) of the MG2 rotational acceleration value dωm/dt toward a negative side (increasing toward the negative side) as compared with the standard target trajectory Lms that is set in the case without the battery limitation, so that the shifting action is completed rapidly thereby for reducing consumption of an inertia energy by an engine friction and avoiding excessive reduction of the engine rotating speed ωe.

If a negative determination (NO) is obtained at step S3, the control flow goes to step S5 corresponding to the functions of the transmission shifting control portion 82, hybrid control portion 84 and target-trajectory setting portion 86, to implement the power-on shift-up action of the step-variable transmission portion 20 in the case with the battery limitation. In step S5, where the maximum discharging amount Wout of the battery 52 is limited, the target trajectory Lm (target value αm) of the MG2 rotational acceleration value dωm/dt is shifted toward a negative side (increased toward the negative side) as compared with the standard target trajectory Lms set in the case without the battery limitation such that the engine rotating speed ωe is changed along the standard target trajectory Les set in the case without the battery limitation.

Figure 12:
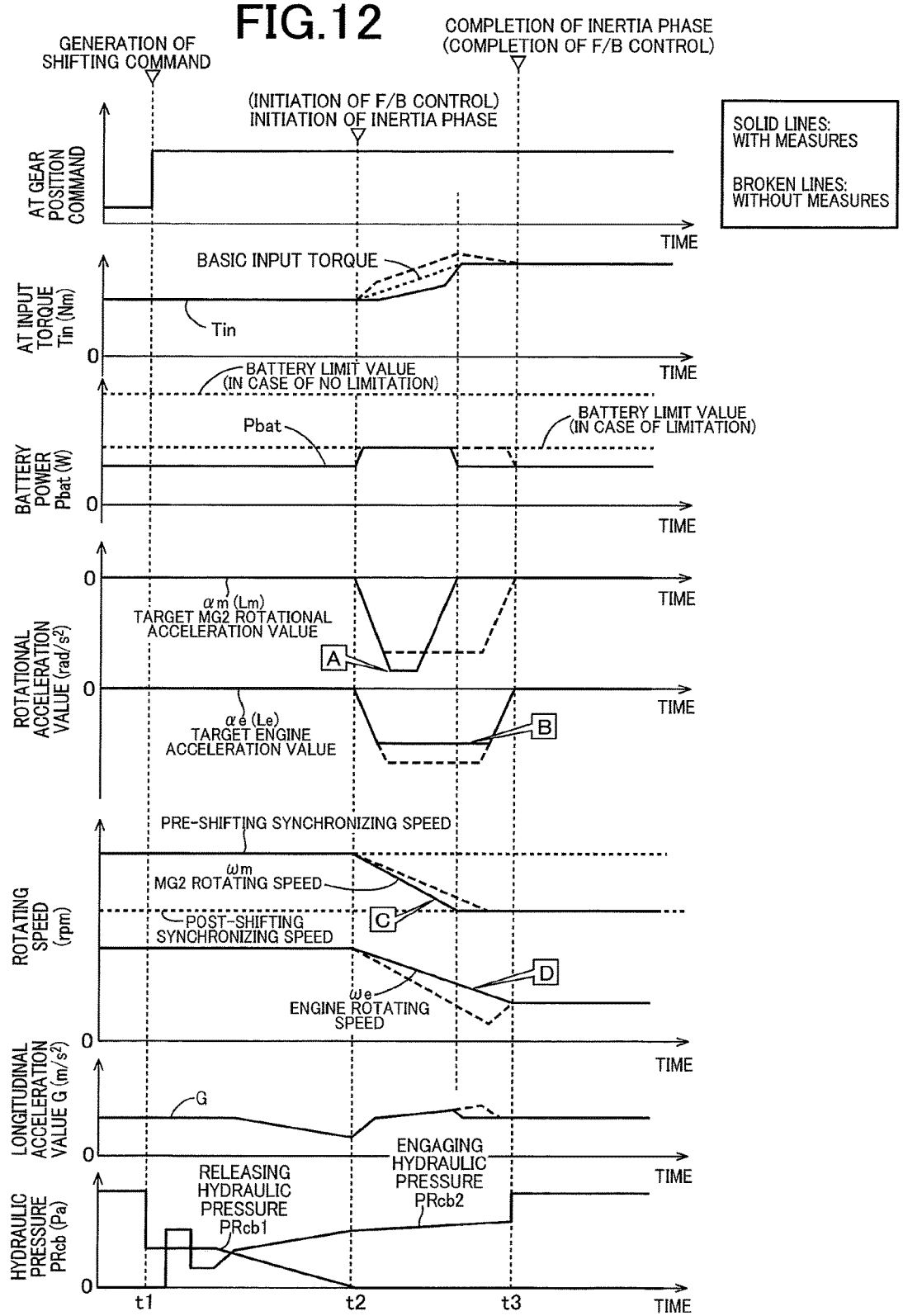
FIG. 12 is a time chart illustrating an example of a control operation executed as shown in the flow chart of FIG. 10, for explaining a control status during the power-on shift-up action of the step-variable transmission portion implemented in a case in which the maximum discharging amount of the battery is limited.

FIG. 12 is the time chart illustrating an example of control status when the shifting control is executed as shown in the flow chart of FIG. 10, for explaining the control status (corresponding to step S5 of FIG. 10) during the power-on shift-up action of the step-variable transmission portion 20 implemented in the case in which the maximum discharging amount Wout of the battery 52 is limited. In the inertia phase that is initiated at the point of time t2, the target trajectory Le of the engine rotational acceleration value dωe/dt is set to be equal to the standard target trajectory Les that is set in the case without the battery limitation (see "B" in FIG. 12), so that the engine rotating speed ωe is changed along the standard target trajectory Les set in the case without the battery limitation. Meanwhile, the target trajectory Lm of the MG2 rotational acceleration value dωe/dt is shifted toward a negative side (see "A" in FIG. 12) as compared with the target trajectory Lm of the MG2 rotational acceleration value dωm/dt (indicated by broken line) without measures. Thus, although the reduction of the MG2 rotating speed ωe is made earlier (namely, the shifting time is made shorter) (see "C" in FIG. 12) than in the case without the battery limitation, the reduction of the engine rotating speed ωe is restrained (see "D" in FIG. 12) for thereby avoiding the vehicle operator from feeling uncomfortable due to the excessive reduction of the engine rotating speed ωe during the shifting action.

If a negative determination (NO) is obtained at step S2 of FIG. 10, the control flow goes to step S6 corresponding to the function of the vehicle-state determining portion 87, to determine whether the vehicle is in the power-off state (driven state) or not. If an affirmative determination (YES) is obtained at step S6, the control flow goes to step S7 corresponding to the functions of the transmission shifting control portion 82, hybrid control portion 84 and target-trajectory setting portion 86. In step S7, when the power-off shift-down action is implemented in the state in which the maximum charging amount Win of the battery 52 is limited, the target trajectory Lm of the MG2 rotational acceleration value dωm/dt in the vicinity of completion of the rotation synchronization is shifted toward a positive side as compared with of the standard target trajectory Lms that is set in the case without the battery limitation.

FIG. 13 is the time chart illustrating an example of control status when the shifting control is executed as shown in the flow chart of FIG. 10, for explaining the control status (corresponding to step S7 of FIG. 10) during the power-off shift-down action of the step-variable transmission portion 20 implemented in the case in which the maximum charging amount Win of the battery 52 is limited. In the vicinity of the point of time t3 at which the inertia phase is completed, the target trajectory Lm of the MG2 rotational acceleration value dωm/dt is shifted toward a positive side (see "A" in FIG. 13) as compared with the standard target trajectory Lms that is set in the case without the battery limitation. In connection with this, the MG2 rotating speed ωm reaches the post-shifting synchronizing speed earlier as compared with in the case without the battery limitation, and the engine rotating speed ωe is restrained from being increased (see "B" in FIG. 13). Thus, since the MG2 rotating speed ωe in the vicinity of the completion of the inertia phase is higher than in the case without the battery limitation, the longitudinal acceleration value G is slightly fluctuated in the vicinity of completion of the rotation synchronization. However, an inertia energy is consumed by rotation of the second motor/generator MG2, so that the increase of the engine rotating speed ωe is restrained (see "C" in FIG. 13) in spite of the limitation of the battery power Pbat. Therefore, a shock generated upon completion of the rotation synchronization can be in a tolerable level while the increase of the engine rotating speed ωe can be restrained so that it is possible to establish a well-balanced drivability.

If a negative determination (NO) is obtained at step S6 of FIG. 10, the control flow goes to step S8 corresponding to the function of the transmission shifting control portion 82, hybrid control portion 84 and target-trajectory setting portion 86, to execute a normal control based on the standard target trajectories Lm, Le that is set in the case without the battery limitation.

As described above, in the present embodiment, when it is predicted that the MG2 rotational acceleration value dωm/dt of the second motor/generator MG2 and the engine rotational acceleration value dωe/dt of the engine 14 cannot be changed along respective the standard target trajectories, due to conditions relating to limitations of the maximum charging and discharging amounts Win, Wout of the battery 52, it is possible to modify the standard target trajectories Lms, Les, namely, set suitable target trajectories Lm, Le which are predetermined depending on the conditions and which satisfy the shifting performance requirements. Thus, the output torque Tg of the first motor/generator MG1 and the output toque Tm of the second motor/generator MG2 can be controlled such that the MG2 rotational acceleration value dωm/dt and the engine rotational acceleration value dωe/dt are changed along the target trajectories Lm, Le that are set as described above, so that it is possible to satisfy the shifting performance requirements even in presence of the limitations of the maximum charging and discharging amounts of the battery 52.

In the present embodiment, when the maximum charging amount Win of the battery 52 is limited during the power-off shift-up action of the step-variable transmission portion 20, the target trajectory Le of the engine rotational acceleration value dωe/dt is shifted toward a positive side as compared with when the maximum charging amount Win is not limited, such that the MG2 rotating speed ωm is changed along the same trajectory as when the maximum charging amount Win is not limited. Thus, although the engine rotating speed ωe reaches a target speed at a later point of time, the MG2 rotating speed ωm can be changed in the same manner as in a case without limitation of the maximum charging amount Win. Therefore, a delay of the shifting action can be reduced thereby making possible to reducing a shifting shock that could be caused, particularly, by a backup control, which is executed to forcibly cause the engaging coupling device to be placed in its engaged state when the shifting action is delayed. Further, it is possible to reduce delay of generation of an engine brake, which could be caused by the delay of the shifting action. Still further, when the maximum charging amount Win of the battery 52 is limited during the power-off shift-up action of the step-variable transmission portion 20, the fuel cut is executed for suspending the fuel supply to the engine 14, so that an inertia power can be consumed by an engine friction that is caused by the fuel cut, and the shifting action can be caused to progress. Moreover, when the maximum charging amount Win of the battery 52 is limited and the fuel cut of the engine 14 is not executed during the power-off shift-up action of the step-variable transmission portion 20, the torque capacity of the step-variable transmission portion 20 is generated or increased thereby causing a drag in the step-variable transmission portion 20, so that an inertia energy is consumed by the drag caused in the step-variable transmission portion 20 thereby making it possible to cause the shifting action to progress.

In the present embodiment, when the maximum discharging amount Wout of the battery 52 is limited and the fuel cut of the engine 14 is executed during the power-off shift-up action of the step-variable transmission portion 20, the target trajectory Lm of the MG2 rotational acceleration value dωm/dt is shifted toward a negative side as compared with when the maximum discharging amount Wout is not limited, such that the rotating speed ωe of the engine 14 is changed along the same trajectory as when the maximum discharging amount Wout is not limited. Thus, an energy consumption is reduced by expediting the progress of the shifting action, whereby an excessive reduction of the rotating speed ωe of the engine 14 can be restrained.

In the present embodiment, when the maximum charging amount Win of the battery 52 is limited during the power-off shift-down action of the step-variable transmission portion 20, the target trajectory Lm of the MG2 rotational acceleration value dωm/dt is shifted toward a positive side as compared with when the maximum charging amount Win is not limited, such that the rotating speed ωe of the engine 14 at the stage at which the difference between the AT input speed ωi of the step-variable transmission portion 20 and the post-shifting synchronizing speed becomes not larger than the predetermined value, is changed along the same trajectory as when the maximum charging amount Win is not limited. Thus, the rotating speed ωm of the second motor/generator MG2 is increased in the vicinity of completion of the shifting action, for thereby consuming an inertia power and making possible to restrain the rotating speed ωe of the engine 14 from being increased.

In the present embodiment, when the maximum discharging amount Wout of the battery 52 is limited during the power-on shift-up action of the step-variable transmission portion 20, the target trajectory Lm of the MG2 rotational acceleration value dωm/dt is shifted toward a negative side as compared with the standard target trajectory Lms that is set when the maximum discharging amount Wout is not limited, such that the rotating speed ωe of the engine 14 is changed along the same trajectory as when the maximum discharging amount Wout is not limited: Thus, the progress of the shifting action can be accelerated whereby an excessive reduction of the rotating speed ωe of the engine 14 can be restrained.

While the preferred embodiment of this invention has been described in detail by reference to the drawings, it is to be understood that the invention may be otherwise embodied.

For example, in the illustrated embodiment, the charging threshold value Winf and the discharging threshold value Woutf may be changed, as needed, depending on (i) which one of the shifting modes or actions (such as the above-described power-on shift-up action, power-off shift-up action, power-on shift-down action and power-off shift-down action) is to be performed in the step-variable transmission portion 20, (ii) between which AT speed positions the shifting action is to be performed in the step-variable transmission portion 20, and (iii) the vehicle running speed V, for example.

In the illustrated embodiment, the step-variable transmission portion 20 is a planetary gear type automatic transmission having the four AT gear positions for forward driving of the vehicle 10. However, the step-variable transmission portion 20 may have any construction with any number of gear positions, as long as the step-variable transmission portion 20 is an automatic transmission having a plurality of gear positions each of which is selectively established with engagement of a selected one or ones of a plurality of coupling devices.

In the illustrated embodiment, the differential mechanism 32 is the planetary gear set of the single-pinion type having the three rotary elements. However, the differential mechanism 32 may be replaced by a differential mechanism including a plurality of planetary gear sets which are connected to each other and which have four or more rotary elements. Alternatively, the differential mechanism 32 may be a planetary gear set of a double-pinion type, or a differential gear device including a pinion rotated by the engine 14 and a pair of bevel gears which mesh with the pinion and which are connected to the first motor/generator MG1 and the intermediate power transmitting member 30.

It is to be understood that the embodiment and modifications described above are given for illustrative purpose only, and that the present invention may be embodied with various other changes and improvements which may occur to those skilled in the art.

NOMENCLATURE OF ELEMENTS

10: Hybrid vehicle
14: Engine
20: Step-variable transmission portion (Step-variable transmission)
28: Drive wheels
52: Battery (Electric power storage device)
80: Electronic control device (Control apparatus)
82: Transmission shifting control portion (Shift control portion)
84: Hybrid control portion
86: Target-trajectory setting portion
CB: Coupling devices
MG1: First motor/generator
MG2: Second motor/generator
RE1-RE3: First through third rotary elements

What is claimed is:

1. A control apparatus for a vehicle provided with: (i) an engine; (ii) a first motor/generator; (iii) a second motor/generator which is operatively connected to an intermediate power transmitting member; (iv) a differential mechanism having a first rotary element to which the engine is operatively connected, a second rotary element to which the first motor/generator is operatively connected, and a third rotary element to which the intermediate power transmitting member is connected; (v) a step-variable transmission which constitutes a part of a power transmitting path between the intermediate power transmitting member and drive wheels and which is placed in a selected one of a plurality of speed positions with engagement of a selected one or ones of a plurality of coupling devices; and (vi) an electric power storage device to and from which an electric power is supplied from and to the first motor/generator and the second motor/generator, said control apparatus comprising:

a transmission shifting control portion configured to implement a shifting action of the step-variable transmission from one of the plurality of speed positions to another of the plurality of speed positions, by controlling a releasing action of a releasing coupling device and an engaging action of an engaging coupling device, the releasing coupling device being one of the plurality of coupling devices which has been placed in an engaged state before initiation of the shifting action, the engaging coupling device being another of the plurality of coupling devices which is to be placed in the engaged state after completion of the shifting action;

a hybrid control portion configured to control an output torque of the first motor/generator and an output torque of the second motor/generator, based on an output torque of the engine and a transmitted torque to be transmitted through an initiative coupling device that is one of the releasing coupling device and the engaging coupling device, which causes the shifting action to progress, such that a rotational acceleration value of the second motor/generator and a rotational acceleration value of the engine are changed along respective target trajectories during the shifting action of the step-variable transmission; and a target-trajectory setting portion configured to set the target trajectories of the rotational acceleration value of the second motor/generator and the rotational acceleration value of the engine, based on a maximum charging amount of the electric power that can be charged to the electric power storage device and a maximum discharging amount of the electric power that can be discharged from the electric power storage device.

2. The control apparatus according to claim 1, wherein, during a power-on shift-up action of the step-variable transmission which is performed with an accelerating member of the vehicle being placed in an operated position, or during a power-off shift-down action of the step-variable transmission which is performed with the accelerating member being placed in a non-operated position, said hybrid control portion is configured to control the output torque of the first motor/generator and the output torque of the second motor/generator, based on the output torque of the engine and the transmitted torque to be transmitted through the engaging coupling device as the initiative coupling device, and wherein, during a power-off shift-up action of the step-variable transmission which is performed with the accelerating member being placed in the non-operated position, or during a power-on shift-down action of the step-variable transmission which is performed with the accelerating member being placed in the operated position, said hybrid control portion is configured to control the output torque of the first motor/generator and the output torque of the second motor/generator, based on the output torque of the engine and the transmitted torque to be transmitted through the releasing coupling device as the initiative coupling device.

3. The control apparatus according to claim 2, wherein said target-trajectory setting portion is configured, when the power-off shift-up action of the step-variable transmission is implemented with the maximum charging amount of the electric power being not larger than a lower limit value, to shift the target trajectory of the rotational acceleration value of the engine toward a positive side, as compared with when the power-off shift-up action is implemented with the maximum charging amount being larger than the lower limit value, such that a rotating speed of the second motor/generator is changed substantially in the same manner as when the power-off shift-up action is implemented with the maximum charging amount being larger than the lower limit value.

4. The control apparatus according to claim 3, wherein said hybrid control portion is configured to suspend supply of fuel to the engine, when the power-off shift-up action of the step-variable transmission is implemented with the maximum charging amount of the electric power being not larger than the lower limit value.

5. The control apparatus according to claim 3, wherein said transmission shifting control portion is configured to increase a torque capacity of the step-variable transmission, when the power-off shift-up action of the step-variable transmission is implemented with the maximum charging amount of the electric power being not larger than the lower limit value and without supply of fuel to the engine being suspended.

6. The control apparatus according to claim 2, wherein said target-trajectory setting portion is configured, when the power-off shift-up action of the step-variable transmission is implemented with the maximum discharging amount of the electric power being not larger than a lower limit value and with supply of fuel to the engine being suspended, to shift the target trajectory of the rotational acceleration value of the second motor/generator toward a negative side, as compared with when the power-off shift-up action is implemented with the maximum discharging amount being larger than the lower limit value, such that a rotating speed of the engine is changed substantially in the same manner as when the power-off shift-up action is implemented with the maximum discharging amount being larger than the lower limit value.

7. The control apparatus according to according to claim 2, wherein said target-trajectory setting portion is configured, when the power-off shift-down action of the step-variable transmission is implemented with the maximum charging amount of the electric power being not larger than a lower limit value, to shift the target trajectory of the rotational acceleration value of the second motor/generator toward a positive side, as compared with when the power-off shift-down action is implemented with the maximum charging amount being larger than the lower limit value, such that a rotating speed of the engine at a stage at which a difference between an input speed of the step-variable transmission and a post-shifting synchronizing speed becomes not larger than a predetermined value, is changed substantially in the same manner as when the power-off shift-down action is implemented with the maximum charging amount being larger than the lower limit value.

8. The control apparatus according to according to claim 2, wherein said target-trajectory setting portion is configured, when the power-on shift-up action of the step-variable transmission is implemented with the maximum discharging amount of the electric power being not larger than a lower limit value, to shift the target trajectory of the rotational acceleration value of the second motor/generator toward a negative side, as compared with when the power-on shift-up action is implemented with the maximum discharging amount being larger than the lower limit value, such that a rotating speed of the engine is changed substantially in the same manner as when the power-on shift-up action is implemented with the maximum discharging amount being larger than the lower limit value.

9. The control apparatus according to claim 1, wherein said target-trajectory setting portion is configured, when a power-off shift-up action of the step-variable transmission is implemented with the maximum charging amount of the electric power being not larger than a lower limit value, to shift the target trajectory of the rotational acceleration value of the engine toward a positive side, as compared with when the power-off shift-up action is implemented with the maximum charging amount being larger than the lower limit value, such that a rotating speed of the second motor/generator is changed substantially in the same manner as when the power-off shift-up action is implemented with the maximum charging amount being larger than the lower limit value.

10. The control apparatus according to claim 9, wherein said hybrid control portion is configured to suspend supply of fuel to the engine, when the power-off shift-up action of the step-variable transmission is implemented with the maximum charging amount of the electric power being not larger than the lower limit value.

11. The control apparatus according to claim 9, wherein said transmission shifting control portion is configured to increase a torque capacity of the step-variable transmission, when the power-off shift-up action of the step-variable transmission is implemented with the maximum charging amount of the electric power being not larger than the lower limit value and without supply of fuel to the engine being suspended.

12. The control apparatus according to claim 1, wherein said target-trajectory setting portion is configured, when a power-off shift-up action of the step-variable transmission is implemented with the maximum discharging amount of the electric power being not larger than a lower limit value and with supply of fuel to the engine being suspended, to shift the target trajectory of the rotational acceleration value of the second motor/generator toward a negative side, as compared with when the power-off shift-up action is implemented with the maximum discharging amount being larger than the lower limit value, such that a rotating speed of the engine is changed substantially in the same manner as when the power-off shift-up action is implemented with the maximum discharging amount being larger than the lower limit value.

13. The control apparatus according to according to claim 1, wherein said target-trajectory setting portion is configured, when a power-off shift-down action of the step-variable transmission is implemented with the maximum charging amount of the electric power being not larger than a lower limit value, to shift the target trajectory of the rotational acceleration value of the second motor/generator toward a positive side, as compared with when the power-off shift-down action is implemented with the maximum charging amount being larger than the lower limit value, such that a rotating speed of the engine at a stage at which a difference between an input speed of the step-variable transmission and a post-shifting synchronizing speed becomes not larger than a predetermined value, is changed substantially in the same manner as when the power-off shift-down action is implemented with the maximum charging amount being larger than the lower limit value.

14. The control apparatus according to according to claim 1, wherein said target-trajectory setting portion is configured, when a power-on shift-up action of the step-variable transmission is implemented with the maximum discharging amount of the electric power being not larger than a lower limit value, to shift the target trajectory of the rotational acceleration value of the second motor/generator toward a negative side, as compared with when the power-on shift-up action is implemented with the maximum discharging amount being larger than the lower limit value, such that a rotating speed of the engine is changed substantially in the same manner as when the power-on shift-up action is implemented with the maximum discharging amount being larger than the lower limit value.

* * * * *